United States Patent
McMonigle et al.

(10) Patent No.: US 12,423,025 B1
(45) Date of Patent: Sep. 23, 2025

(54) SHUFFLE-BASED REQUEST BUFFER FOR MANAGING LARGE REQUEST VOLUMES

(71) Applicant: Amazon Technologies, Inc., Reno, NV (US)

(72) Inventors: Connor William McMonigle, Portland, OR (US); Stephen Abel, Portland, OR (US); Nandan Bharatkumar Badheka, Santa Barbara, CA (US); Adam Ross, Louisville, CO (US); Lucas Langdon Bengtson, Portland, OR (US); Jonathan Rand Hall, Portland, OR (US); Gary Hertel, Portland, OR (US); Jared James Stewart, Portland, OR (US); Jocelyn Danae Spayd, Vancouver, WA (US); Michael Kale, Portland, OR (US); Liyuan Liu, Seattle, WA (US); Marisol Curtis, Portland, OR (US); Alexander Scott Mastrangelo, Seattle, WA (US); Nicolas Weil, Portland, OR (US); Nina Jeong Lane, Portland, OR (US); Arden Rasmussen, Portland, OR (US); Ruochen Han, Chandler, AZ (US); Shruti Prakash Singh, Portland, OR (US); Kyle Sletmoe, Portland, OR (US); Saurav Sengupta, Beaverton, OR (US); Vinay Kumar Calastry Ramesh, Hillsboro, OR (US); Yufei Gao, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 18/674,735

(22) Filed: May 24, 2024

(51) Int. Cl.
*G06F 3/06* (2006.01)
*G06F 7/58* (2006.01)

(52) U.S. Cl.
CPC .......... *G06F 3/0656* (2013.01); *G06F 3/0613* (2013.01); *G06F 3/067* (2013.01); *G06F 7/588* (2013.01)

(58) Field of Classification Search
CPC ...... G06F 3/0656; G06F 3/0613; G06F 3/067; G06F 7/588
See application file for complete search history.

(56) References Cited

U.S. PATENT DOCUMENTS

| | | | |
|---|---|---|---|
| 9,727,279 B2 * | 8/2017 | Suzuki | G06F 3/0659 |
| 10,762,435 B2 * | 9/2020 | Yang | H04L 67/1014 |
| 2024/0361912 A1 * | 10/2024 | Basit | G06F 3/0683 |

* cited by examiner

*Primary Examiner* — Mark A Giardino, Jr.
(74) *Attorney, Agent, or Firm* — Hogan Lovells US LLP

(57) ABSTRACT

Approaches are disclosed for managing aspects of content delivery in a multi-tenant environment. A request buffer can be used to remove correlations between requests and randomly shuffle requests without storing all the requests concurrently. A shuffle sharding algorithm can be used to randomly allocate a subset of resources to different users in order to ensure less than a maximum risk of one user impacting the use of all resources allocated to other users. In some embodiments, separate fleets of resources can be maintained for manifests and video segments to allow for more accurate scaling and customization. Multiple manifests can also be associated with a single endpoint to allow multiple media players to obtain similar content segments from the single endpoint.

20 Claims, 14 Drawing Sheets

SHUFFLE-BASED REQUEST BUFFER FOR MANAGING LARGE REQUEST VOLUMES

BACKGROUND

An ever-increasing amount of media content is being made available electronically. There is also an increasing variety of devices and players used to provide playback of this content using different presentation parameters. Further, an increasing amount of this content is live streaming content, which can create spikes in demand around certain events or occurrences in the live streaming data. The need to provide live content in a variety of formats to a large number of devices can create significant issues for a media distribution service or network. For example, spikes in request traffic can result in unacceptable amounts of latency, or can even impact the availability of certain content. Allowing a large number of users to concurrently access the same set of resources can also increase the potential risk of a malicious actor taking down some of those resources. The need to store and maintain separate records and files for these various formats and configurations can also increase the cost and complexity of a content distribution service.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Figure 1:
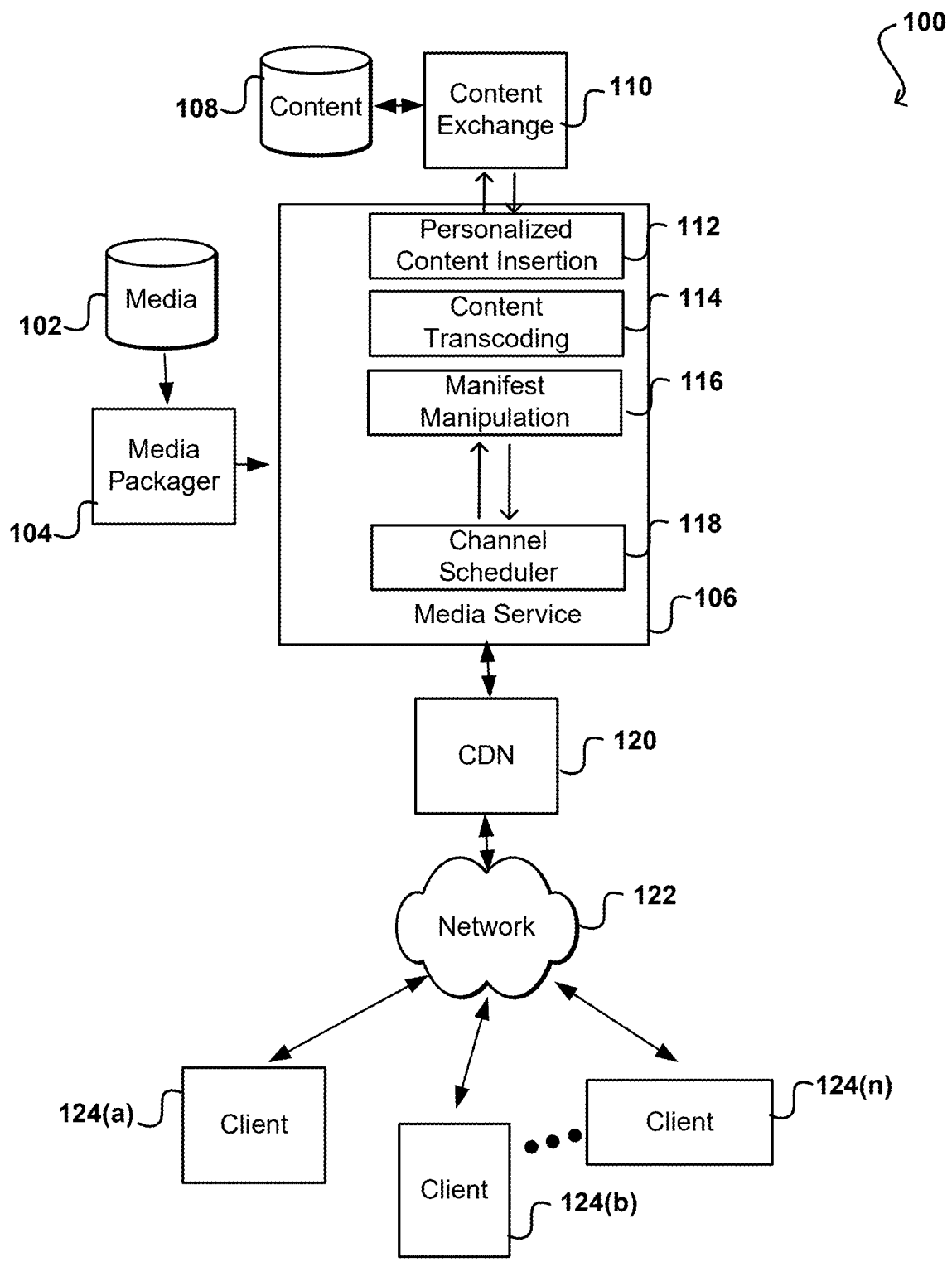
FIG. 1 illustrates an example system to provide media content, in accordance with various embodiments.

FIG. 1 illustrates components of an example media delivery service 100 in accordance with at least one embodiment. In this example, there may be a source of media content 102, such as a repository or live transmission service, from which media is to be obtained that can be provided to various client devices 124(a)-(n) over at least one network 122. The media content can be packaged by a media packager 104, for example, and the packaged media content provided as input to a media service 106 for processing before transmission. The media service 106 can perform processing such as to transcode the content into different encodings required by media players on different client devices 124(a)-(n), as well as to change formats, resolutions, and other such aspects. The media service may also perform some amount of manifest manipulation 116, such as to provide instructions to a receiving media player as to how to download, receive, and/or play a particular media file based in part on the transcoding. The media service can also perform tasks such as channel assembly and scheduling 118 for transmission of instances of the content over respective channels, as may be determined in conjunction with a content delivery network (CDN) 120 in this example. Such an approach can be used to create linear over-the-top (OTT) channels using existing video content.

In this example, the media service 106 can also include a module 112 for personalized content insertion. This may include, for example, using information for a specific media player (or a user associated with a media player) to select supplemental content to be transmitted with the primary media content. This may include, for example, advertising or promotional material determined to have a probability of being relevant to a viewer of the content as presented by the respective media player, as may be inserted into an ad break or other scheduled (or unscheduled) opportunity in the primary content stream. In this example, the supplemental content may be selected and provided by a content exchange 110, which may be operated by a third party, as may be selected from a supplemental content repository 108 or other such source. In at least one embodiment, supplemental content can be at the location of the start of a requested stream, prior to delivery. This eliminates the need to build and maintain unique configurations for every type of client device in order to insert personalized ads during video playback. Instead, a media service can generate and maintain a unique manifest file for each viewer, which is can be used to deliver supplemental content placements that are personalized to the individual. Supplemental content can be seamlessly inserted into a primary content stream and can be played from the same source location to reduce the risk of buffering caused by high format and bitrate variability during video playback. This also reduces the effects of content blocking software by making supplemental content difficult to distinguish from primary content.

A media manifest manipulation module 116 can assemble linear channels using existing and/or generated content. The content can be delivered with a consolidated manifest that includes primary content and personalized, supplemental content in a continuous stream to give viewers a seamless, TV-like viewing experience without buffering between program content and breaks. Support can be provided for technologies such as HTTP Live Streaming (HLS) and Dynamic Adaptive Streaming over HTTP (DASH) standard manifests, as well as playlists including Common Media Application Format (CMAF), allowing content such as live streaming content to be viewed on a broad range of devices and players.

There may be other modules or functionality provided by a media service as well within the scope of various embodiments. For example, a media service 106 can provide for hybrid measurement and reporting. The service can provide accurate measurement and reporting of content such as Internet-delivered video advertising, such as may be required for entities such as advertisers and video providers to be compensated for every supplemental content placement. A media service 106 can achieve the Interactive Advertising Bureau (IAB) level of playback metrics, for example, by implementing measurement and reporting from the client side through playback observation application programming interfaces (APIs) deployed on the viewing device. In addition, such a media service can report server-side metrics for legacy set-top boxes and other devices where changes to the viewing device is not possible, in order to comply with IAB specifications. Such a service can also provide for auto-scaling, where resources can be scaled up and down as needed with changes in viewership. A media service 106 can automatically scale with the number of concurrent viewers, maintaining consistent performance and quality of service for network-delivered video content.

In at least one embodiment, a media service 106 can allow for a choice of video workflow components, including various vendors or third party solutions. This can include those components of the video workflow that operate directly with the service: the content delivery network (CDN) 120, content decision server, and origin server, among other such components or systems. A media service 106 can work with most standard CDN or content decision servers, and can work with origin servers accessible over protocols such as HTTP that can be configured using common video streaming protocol and proper ad markers. A media service 106 can be operated as a standalone service, or can be integrated with other services, such as those relating to live video encoding, video-on-demand (VOD) processing, just-in-time (JIT) packaging, or media-optimized storage.

Server-side ad insertion solutions typically do not provide detailed client-side viewing metrics. Server-side solutions generally report on CDN server logs of requests to ad server, which do not offer the granularity of client-based viewing metrics that entities such as advertisers require. Other solutions may require software development kit (SDK) or specific player integration to handle server-side stitched manifests. In contrast, a media service 106 as disclosed herein does not require specific player or SDK integration to work. In addition, such a media player can be configured to make callbacks to a common endpoint for both primary and supplemental content, rather than known content serving entities, bypassing content blocking strategies. A media service 106 can use client request information in real-time to communicate with content decision servers and dynamically generate personalized manifests and instances of supplemental content. There is no need for customers to scale origin infrastructure to cope with delivering personalized manifests.

As mentioned, a media service 106 can provide a transcode service 114 that works to ensure there are no jarring discontinuities in aspects such as aspect ratio, resolutions, and video bitrate for transitions between primary and supplemental content during playback. Such a service can use responses, such as standard VAST and VMAP responses, from content servers to pull down a high-quality version of the supplemental asset and provision real-time transcoding and packaging resources to format it to the same video and audio parameters as the primary content.

Figure 2A:
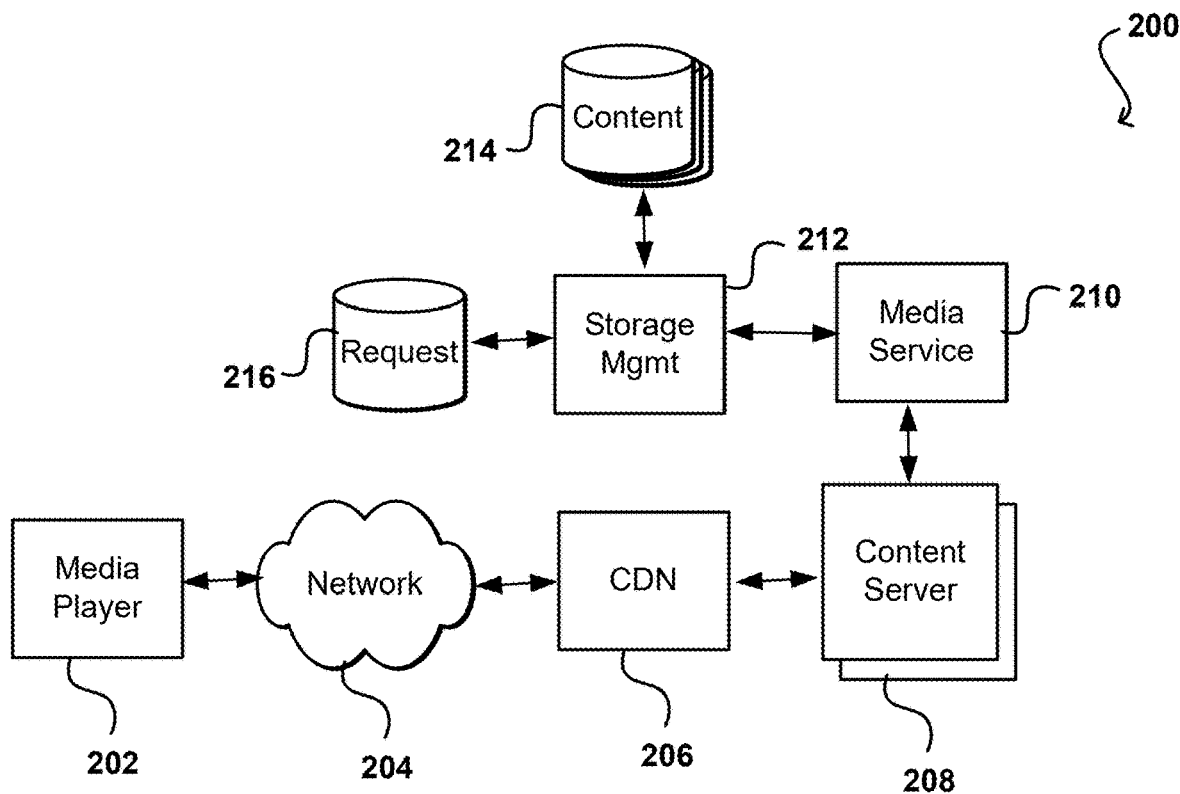
FIGS. 2A and 2B illustrate a system for storing content, such as media segments, as well as an element table that can be used with a shuffle buffer, in accordance with various embodiments.

FIG. 2A illustrates an example content delivery network 200 that can be used in accordance with various embodiments. In various distributed systems, such as systems that use multi-tenant or "cloud"-based resources to process and transmit content, there may be data distributed across a number of storage nodes. In such a delivery network or system, a storage management service 212 or other such component can direct traffic to the appropriate storage node 214. A storage node 214 can correspond to, for example, a database or content repository that can be used to store and access instances of content. Each storage node 214 might store instances of content. When a request for primary content is received from a media player 202, for example, a content server 208 can work with a storage management service 212 to location and obtain a copy of the content, which might be processed by a media service 210 before sending the processed (e.g., transcoded) content via a CDN 206 over at least one network 204, to the media player 202 for playback or other presentation. Other types of requests may be received and processed using such an approach as well, as may relate to requests to delete or "clean up" files stored to storage locations across a multi-tenant environment, among other such options.

There may be periods of time where a large number of requests are received that relate to a single piece, instance, stream, or type of data, which might be stored on a single storage node 214. Problems may frequently occur for such pessimal data access patterns, where a spike in correlated requests for data is all routed to a single storage node. Pessimal data access patterns can overwhelm the limited resources of a single storage node, resulting in throttles, errors, and other potential problems.

Figure 2B:
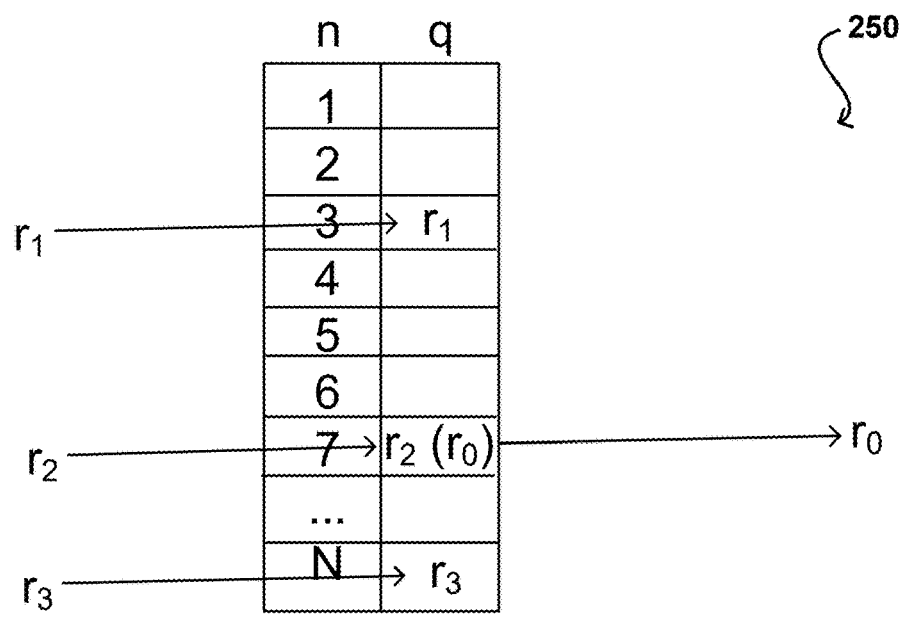

Approaches in accordance with various embodiments can address these and other potentially problematic data access patterns by employing a request distribution algorithm to more evenly spread received requests over time. In at least one embodiment, such a distribution algorithm can provide for randomization that may be similar in operation to a shuffle buffer-type algorithm. Such an algorithm can be used with at least a portion of memory or storage that is able to function as a request buffer 216. A sample element table 250 that can be used to act as a request buffer is illustrated in FIG. 2B. In this example, a request buffer can support a number of random accesses B, containing a large number of optional elements N. Each element to be stored in the request buffer can correspond to an optional read request q in at least one application of such an algorithm. For each read request r (or other request requiring access to an instance of data, for example) that is received in an incoming stream of requests, a random optional element q of the number of random accesses B can be read, and replaced atomically with read request r. If random optional element q is not empty, or contains only a placeholder value such as a dummy request or random string or bit, the q is forwarded to the stream of outgoing read requests. In the figure, it is shown that when a first request $r_1$ is received, that request is randomly assigned to element 3 in the request buffer. Since there is no previously received read request stored to that location (and potentially only an optional read request), then the first request can be stored to element 3. When a second request $r_2$ is received, that request might be randomly assigned to element 7 in the buffer. As illustrated, a previous request $r_0$ was already stored to element 3. Accordingly, prior read request $r_0$ will be "pushed" out of the request buffer and forwarded to the appropriate storage node. The second read request $r_2$ can then replace the prior read request as being stored to element 7. If a subsequent request is received $r_2$ that is randomly directed to element N, then since there is no prior read request in that position the third request will be written to that element of the request queue and not forwarded to the storage node until such time as another request is subsequently directed to element N of the request queue.

In at least one application of such an algorithm, a request buffer can be used to effectively remove correlations in an incoming stream of read requests. Such usage can also help to ensure that the outgoing stream of read requests is sufficiently uniformly distributed across a set of storage nodes, even in the case of pessimal data access patterns. Such an approach can balance end-to-end request processing latency with improved overall throughput, where that improved throughput can be obtained using more uniform storage node utilization. Furthermore, the size N of the buffer can be adjusted as well to improve the ability to distribute large volumes of access requests.

In at least one embodiment, such a request buffer can be used advantageously with a video-on-demand (VOD) service. A media service as discussed previously can be used with a VOD service to serve video-on-demand content in various formats, such as in HD live stream formats. For live streams of content, it may be desirable to maintain individual segments of the content for a period of time, such where viewers may have an ability to pause or "rewind" live video for up to a maximum portion of the content, or for up to a maximum duration of time. Afterwards, these segments or instances can be deleted. For live streaming events, there may be many of these delete-type requests received over short periods of time, such as when the live event content is no longer to be available for various media players. In such instances, it can be desirable to maximize the bandwidth across a set of source and/or storage nodes. A request buffer can be used advantageously in such a situation to remove correlations in the incoming stream of delete (and other such) requests. A storage management service can store the requests to a request buffer using a shuffle algorithm as discussed, such that the requests will be randomly selected and thus more uniformly distributed across the various storage nodes. Removing correlations from the outgoing streams can allow for improved balancing across the various storage nodes. Such a process may add a small amount of latency due to the buffering, but can avoid issues with large spikes in request traffic being directed to a single node, which could result in much longer latency or even request failure in some instances. A deep buffer can be maintained that can store a large number of requests to further assist with distribution. In some instances, a maximum time amount might be set for requests stored to a request queue, in order to ensure that an excessive amount of latency is not introduced for any given request as a result of the shuffling process.

In one embodiment, a random (or pseudo-random) index can be generated for each request, such as by using a pseudo-random number generator, and the request inserted into the buffer at that index position. If a prior read request (or other operation) was previously written to that element or position, then that prior read request can be pushed out to the relevant storage node. Randomization can be improved by increasing the size of the buffer, but may require more storage capacity than is desired for a given network or service implementation. In one embodiment, a buffer depth of one million element was observed to provide sufficient shuffling and distribution, while still providing for reasonable resource utilization. Such an approach allows for shuffling a large number of requests, where the number of requests is too large to store in memory at any one time. Such an approach allows for shuffling and randomization even with only a subset of the requests stored in a request buffer over a given period of time.

Such an approach can be relatively straightforward to implement. The approach can provide for reasonable shuffling of requests with only a subset of the requests being queued at any given time. Such an approach also provides for high storage node utilization, and reduces the amount of storage capacity that needs to be provided for a given request queue.

Figure 3:
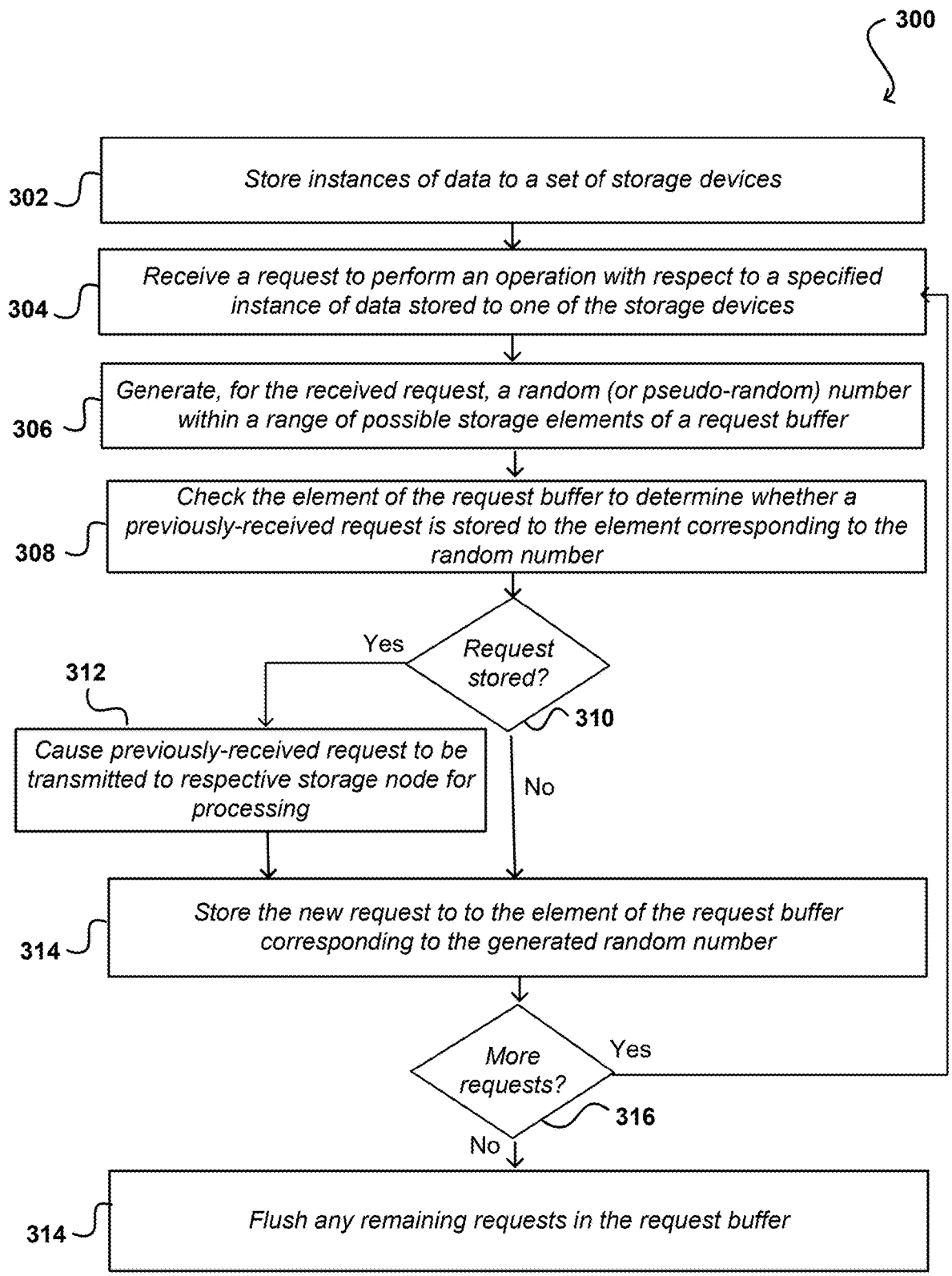
FIG. 3 illustrates an example process to use a shuffle buffer to avoid issues with traffic spikes, in accordance with various embodiments.

FIG. 3 illustrates an example process 300 for managing a flow of requests relating to a set of resources in accordance with at least one embodiment. It should be understood that for this and other processes discussed herein that there can be additional, fewer, or alternative steps performed in similar or alternative orders, or at least partially in parallel, within the scope of the various embodiments unless otherwise specifically stated. Further, although examples herein refer to read requests and storage nodes, it should be understood that advantages of correlation removal and request shuffling can be useful for other types of requests or operations with respect to other types of resources as well within the scope of the various embodiments. In this example, instances of data (e.g., media content segments) are stored 302 to a set of storage devices, such as storage instances. A request can be received 304 to perform an operation with respect to a specified instance of data stored to one of the storage devices. A random (or pseudo-random) number can be generated 306 for the received request, where the random number is within a range of possible elements of a request buffer to which a request can be stored. In some embodiments, the generation of a random number only occurs when the volume or rate of requests reaches or exceeds a specified volume or rate threshold, or other such buffering criterion. Once the random number is generated, the element of the request buffer corresponding to that number can be checked 308 to determine whether a previously-received request is currently stored to that element of the request buffer. If it is determined 310 that a previously-received request is stored to that element, then the previously-received request can be pulled from the request buffer and caused 312 to be transmitted to the respective storage device for processing. The new request can then be stored 314 to the element of the request buffer corresponding to the generated random number. This process can continue while additional requests are received, while the rate or volume remains above the threshold, or another such criterion is satisfied. It can be determined 316 whether there are more requests to be processed during while buffering, and if so then the process can continue with the next received request. If it is determined 316 that there are no more requests received, at least while buffering is being used, then any remaining "orphaned" requests in the buffer can be flushed 318 from the queue and transmitted to the respective storage device. As mentioned, in some embodiments there may also be a maximum period of time that any given request can be stored to a request queue, and at the end of that period the request can be released and transmitted to the respective storage node.

In a media service such as that described with respect to FIG. 1, the media service may be provided using multi-tenant resources, such as cloud resources managed by a cloud provider. This can include servers that manage traffic for a large number of users. An issue with supporting many users using a limited number of resources is that a problem associated with one user may negatively impact several other users that use one or more of the same shared resources. As an example, a user might perform an action that generates a fault or other issue that requires a given resource (e.g., a server or compute instance) to be taken out of service at least temporarily, which can impact any other user relying on that resource during that time.

Accordingly approaches according to at least one embodiment can provide at least some level of isolation between users, such that an issue impacting one or more resources associated with one user will have little impact, if any, on other users using any of those resources. In this way, a user sending (intentionally or otherwise) "bad" data or instructions that generate an issue with a resource will not prevent other users from performing their respective actions using at least some other resources. Such isolation can be provided without provisioning separate resource capacity for each user. At least one approach can provide a probabilistic guarantee that traffic for different users will be distributed across different servers or other such resources. The distribution can occur such that the probability is very low (e.g., below a maximum probability threshold) that any two users are completely overlapping in terms of the resources to which they are allocated. As long as two customers do not have the same set of servers allocated, and thus have at least one different server allocated for each user, then even if one user brings down or negatively impacts all resources associated with that user, the other user will be associated with at least one other resource that is should not be impacted. This may result in some additional latency for the user who is not responsible for the issue, but can ensure that the traffic for that user is not totally impaired due to the issue of the other customer.

Figure 4:
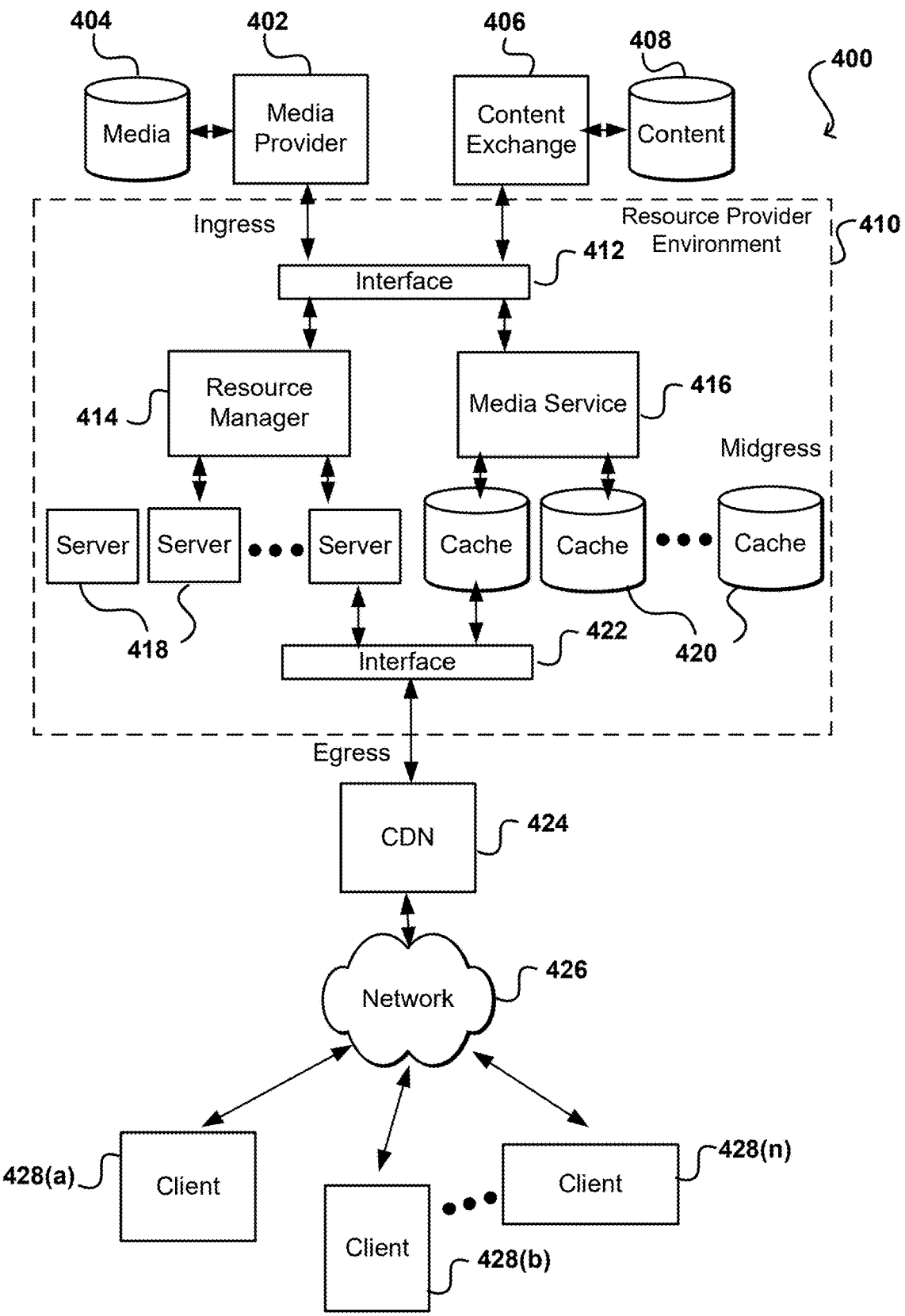
FIG. 4 illustrates an example system to allocate different resources to different users, in accordance with various embodiments.

In one example approach, each user of a set of resources can be assigned to (or otherwise associated with) a subset, grouping, or "shard" of those resources. As an example, FIG. 4 illustrates a content delivery system 400 according to at least one embodiment. As discussed herein, a media service 416 can be provided using a set of resources in a resource provider environment 410 (or other cloud or multi-tenant environment). These can include physical or virtual resources of various types and configurations. The media service 416 may use a set of allocated servers 418 and caches 420 (or other storage resources) that can be provisioned, allocated, and otherwise managed by a resource manager 414. There may be interfaces (e.g., APIs) that can be used to receive content, such as primary content obtained from at least one media source 404 and provided by an external media provider system 402, as well as supplemental content obtained from at least one supplemental content source 408 and provided by a content exchange 406, among other such options. The content may be received to a first interface layer 412, and one or more ingress operations may be performed using one or more allocated servers 418, caches 420, or other such resources for content received into the resource provider environment 410. Similarly, the same or different servers 418 and caches 420 can be used for various egress operations involving content to be transmitted out of the resource provider environment 410, such as to be transmitted through an interface layer 422 to a content delivery network 424 (which may be inside the resource provider environment 410 in some embodiments) to distribute the content across one or more networks 426 to be received by, and presented via, one or more client devices 428(a)-(n) or other such recipients. There may also be a number of midgress operations performed between ingress and egress, such as to manage midgress traffic, or cache miss traffic between locations along the transmission path, such as between ingress and egress edge servers.

There may be many users of such a system 400. Each user may have allocated one or more servers 418 and caches 420 to perform various operations, as may relate to ingress, midgress, egress, content processing, and other such operations. If a user (intentionally or otherwise) causes any of these resources to experience a fault, or potentially need to be taken out of service, that can directly impact other users to which an impacted resource is allocated. Accordingly, approaches in accordance with various embodiments can assign individual users to a subset of these resources in such a way that there is a low probability of any two users being allocated to the same subset of resources. In this way, if a first user causes a fault in one of the servers 418 or caches 420, for example, there will be at least one other server 418 and cache 420 allocated to a second user so the second user will still be able to have operations performed, although potentially with slightly lower performance depending upon the number of resources impacted and not impacted, among other such factors. In this disclosure, this approach to allocating different subsets or "shards" of one or more groups of resources will be referred to as "shuffle sharding." In shuffle sharding, users can be assigned randomly to a subset of resources in such a way that there is at most a determined probability of any two users being allocated to the same subset of resources.

In at least one embodiment, shuffle sharding can be used to improve the resiliency of a multi-tenant video processing system, such as that illustrated in FIG. 4. This can include using shuffle sharding in at least two distinct areas, including use for data plane subdomains for ingest and/or egress, as well as midgress queuing. For ingress and/or egress operations, each user "channel group" resource can be assigned a unique DNS subdomain. A channel group resource in this context will typically include multiple channels. Shuffle sharding can be used to assign each customer subdomain to a subset of service hosts in order to reduce the probability of overlap between any two given customers. This can provide redundancy and protection for individual users. For example, "poison pill" video content (or similar content) may be received (or obtained) on behalf of a first user. The poison pill content can be designed to trigger (or otherwise lead to) shutdown of resources that receive, process, or play the content. Even though such content may be received that is associated with a first user, that user will only have a certain subset of resources allocated, such that only those resources may be taken offline or otherwise impacted. As long as other users are allocated to at least one different resource of each impacted type, those users can still perform their intended operations as those resources should remain available for processing.

Similarly, when live video content is ingested into the system, for example, there can be a pre-processing step called "midgress" performed before the content is made available in one or more outgoing video streams. The video content awaiting midgress can be managed from at least one queue 420, or temporary storage resource. There may be issues that impact various users assigned to these queue resources, such as spillover issues between users if midgress operations are unable to successfully process a given piece of content. This may effectively block, prevent, or delay processing of other content in that queue. Approaches in accordance with at least one embodiment can assign individual users to a subset of queues 420, or queuing resources, instead of a single queue. Shuffle sharding can be used to select which queues, of a set of queues 420, should be allocated to each individual user. As mentioned, the number of total queues and allocated queues can be selected to obtain at most a maximum probability of any two users having the same subset of resources allocated. Such allocation can retain resiliency in the face of problems impacting specific resources, such as may relate to poison pill content that is received and/or processed by a resource that can block the ability to successfully perform one or more midgress operations. In such an approach, a single user (e.g., customer of the resource provider or content provider for which resources are allocated) should not be able to impact midgress processing entirely for any other user, since there will be no total correlation between all of the queues used for any two given customers. In at least one embodiment, a similar approach to queue shuffle sharding can be used to submit requests, such as digital rights management (DRM) key requests in a content protection information exchange (CPIX) format, in a manner that avoids (or at least significantly minimizes) cross-user blast radius in the event of an issue impacting a single user, such as where a single customer has an impaired DRM key server.

Figure 5:
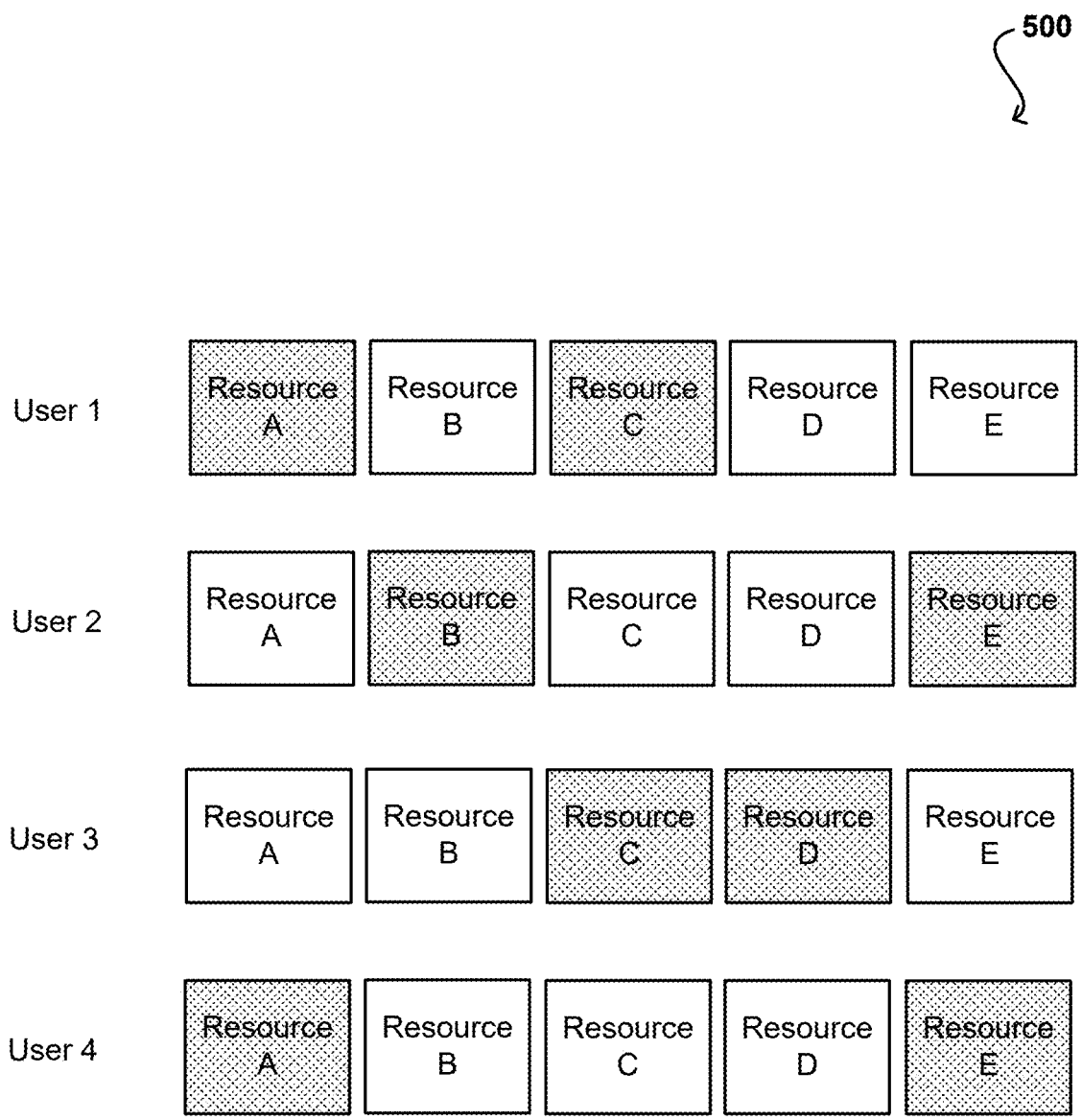
FIG. 5 illustrates an example shuffle sharding example, in accordance with various embodiments.

FIG. 5 illustrates an example shuffle sharding approach 500 that can be used in accordance with various embodiments. A provider can determine a maximum probability of two users having the same resources allocated in a provider environment. In some embodiments a provider might want to guarantee complete diversity, while in others a provider might be willing to accept some maximum probability, or amount of risk, in order to conserve resources, overhead, and allocation complexity. In this example, a provider might determine that a 10% probability of complete resource allocation between two users is acceptable. A provider could then allocate five resources (e.g., resources A-E) of the same type, such as five queue resources to handle midgress operations for a group of users. The provider can then indicate that a shuffle sharding algorithm should pick two of these queues at random to assign to each individual user. A 5-pick-2 algorithm would then provide a 10% probability of any two users having the same two resources selected at random. As illustrated in FIG. 5, selecting two resources from the five resources at random results in none of these users having a complete overlap of allocation (where allocated resources are illustrated as patterned instead of white boxes), such that if resources allocates to User 1 go down, for example, each of users 1-4 will still have at least one resource that is available. Further, although there is a 10% probability of overlap, the likelihood of those users having overlap being users who cause availability (or other) issues with the resources is small, which further reduces the actual overall probability of one user taking down other users in such an allocation. In an example where there a provider wants less than a 1% probability of two users receiving the same allocation, the provider can provide a set of 10 resources and configure the algorithm to allocate 3 resources at random to each users. As there are 120 possible combinations the probability of any two users having the same 3 resource randomly allocated would be less than the 1% maximum threshold. Such allocation provides a form of isolation between users, and the amount of risk a provider is willing to accept can determine the parameters of the sharding algorithm, such as where an N choose M algorithm can have values selected to at most have a probability of same selection for two users that is at the risk threshold (or maximum probability threshold).

In some embodiments, an N-choose-M style algorithm can be used where a provider can specify N (the total number of resources available for a type of task) and M (the number of resources to be randomly selected to be allocated to each user) to obtain a probability of total overlap that is at or below a risk threshold. The provider may also implement a monitoring process to check to determine if such an allocation overlaps with any other user allocation (or more than a maximum number or percentage of other users). Such an implementation can still be much more lightweight than a process that attempts to ensure complete diversity. In some embodiments, diversity verification may be used for only certain users with certain types of accounts, data, or uses that may be more critical than others. For example, users obtaining video content that is not live or where access is provided free of cost then absolute checking may not be applied, where live content may be have diversity checking applied as users would likely be more upset by a loss or significant delay in a portion of a content stream. Sharding can be performed at random using the N-choose-M algorithm, and if it is determined that a given selection would overlap with another user, then another random selection can be made to allocate for a given user. This process may occur at least once, up to a maximum number of iterations, or until a desired amount of overlap or diversity is obtained. As mentioned, such sharding can be used for multiple different resource allocations, such as for managing full incoming requests, midgress queuing, and the like. Such sharding can also be used to reassign user subdomains to reduce a probability of overlap between users, so one user cannot bring down the same hosts for other users. In an embodiment where clips are selected from live content and exported as video-on-demand assets, queuing can be used to store these assets for at least a period of time, and shuffle sharding may be used with these queues to ensure that an excessive number of requests, such as clipping requests, associated with one user does not impair the clipping experience of other users who may share at least one queuing resource.

Figure 6:
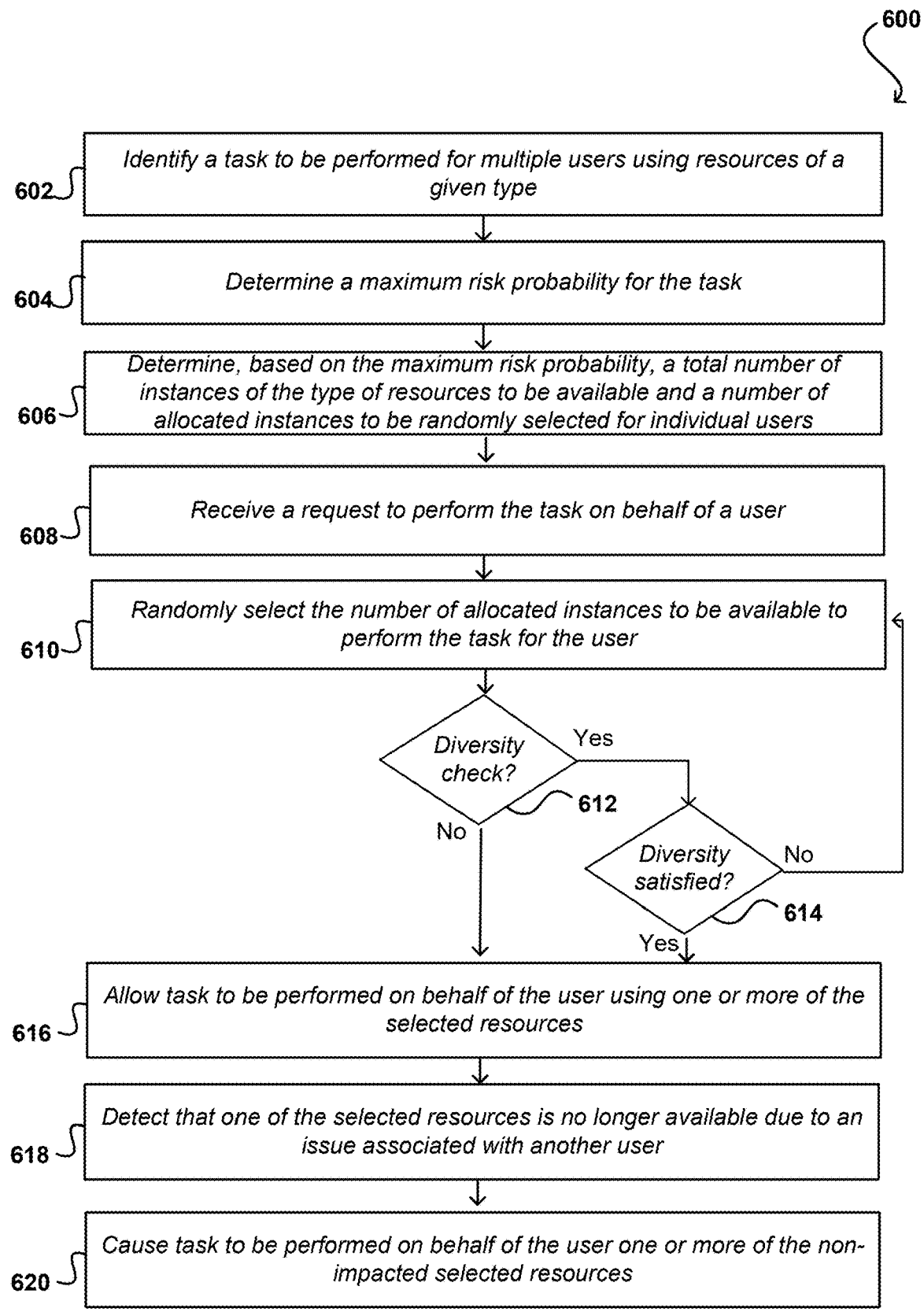
FIG. 6 illustrates an example process to allocate users to different selections of resources, in accordance with various embodiments.

FIG. 6 illustrates an example process 600 for allocating resources for use by individual users in accordance with various embodiments. In this example, at least one task is identified 602 that will need to be performed on behalf of multiple users (or other such parties or entities) using resources of a given type, such as compute or storage instances provided in a resource provider environment. A maximum risk probability can be determined 604 for at least the type(s) of task, where that probability may correspond to a threshold for a number of tasks or group of users, among other such options. Based at least in part on this maximum risk probability, a total number of instances of that type of resource can be determined 606, as well as a number of allocated instances to be randomly selected or individual users. When a request (or one of a number of requests) is subsequently received 608 to perform a task on behalf of one of those users, the number of allocated instances to be available to perform the task on behalf of the user can be randomly selected 610. Once selected, this selection of resources can be used for that user to process other requests without performing another random selection. If it is determined 612 that a diversity check is to be performed, then a diversity check can be performed to determine whether there is another user (or more than a maximum allowable number of users) having the same selected allocation of resources, or whether some other diversity criterion is satisfied. If it is determined 614 that a diversity criterion is not satisfied for such a diversity check, then another random selection can be performed. If a diversity check is not to be performed, or a diversity criterion for such a check is satisfied, then the task can be allowed 616 (or caused) to be performed on behalf of the user using one or more of the selected resources. In some instances one of the selected resources may be used to perform the task while in other instances two or more of the selected instances may be used to perform different operations relating to the task. If there are no issues with any of the servers then the task can be completed successfully using the selected resources. In this example, it is detected 618 that (at least) one of the selected resources is no longer available due to an issue associated with another user who also had that resource selected for performance of a task. The task for the current user can then be caused 620 to be performed on behalf of the current user using one or more of the non-impacted resources that were selected for the current user. If the task was already being performed using only non-impacted resources then the performance can continue, but if at least one operation for the task was being performed using an impacted resource then performance of that operation can be shifted to at least one of the non-impacted resources.

In some embodiments, having less that the full allocation of resources to perform a task for a user may be acceptable as long as there are sufficient resources to perform the task within any appropriate performance guarantees. In other embodiments, at least one new resource can be provisioned and then allocated to the impacted users (other than the user associated with the issue leading to one or more resources being unavailable or otherwise impacted).

In some embodiments, a shuffle sharding approach can be implemented based upon an entire workflow or path through an environment for a particular task and user. For example, there might be potential for upstream or downstream failures that might impact other users, such that selections or allocations may be made at different locations in a workflow to attempt to minimize a blast radius of such a failure with respect to other users. At least some amount of resource selection or request routing can be performed, by randomly selecting between possible options using a shuffle sharding algorithm or model, for example, to attempt to minimize the overall risk throughout the workflow, including potentially operations that may be performed at least partially outside a resource provider or cloud environment.

When using a video content delivery system such as that illustrated in FIG. 1 or 4, there may be different types of content associated with specific video streaming workflows. These types of content can include, for example, segments and manifests. Segments can refer to portions of the actual video or audio content that will be used for playback by media players or other such recipients of the content. Manifests, on the other hand, refer to a document or file associated with an instance of media that lists all of the available segments. In various instances, a media player requested or instructed to provide playback of an instance of media content will first request a manifest for the media content, which can have a consistent name to be used to obtain the list of all the segments which that the media player should request for the content instance. The media player can then request the appropriate segments in order as outlined in the corresponding manifest.

Both manifests and segments therefore need to be retrieved, processed, and at least temporarily stored by one or more resources or resource instances, such as compute or storage instances provided using physical resources of a multi-tenant environment. As issue often arises, however, in the fact that media segments (e.g., segments of high definition video in MP4 or similar format) are frequently much larger than text-based manifest files, and typically require more intensive computations that result in higher utilization demand on processors and/or compute instances. When using a single fleet of compute resources to process both manifests and segments, it can be challenging to appropriately scale the single fleet to concurrently optimize for both workflows.

Figure 7:
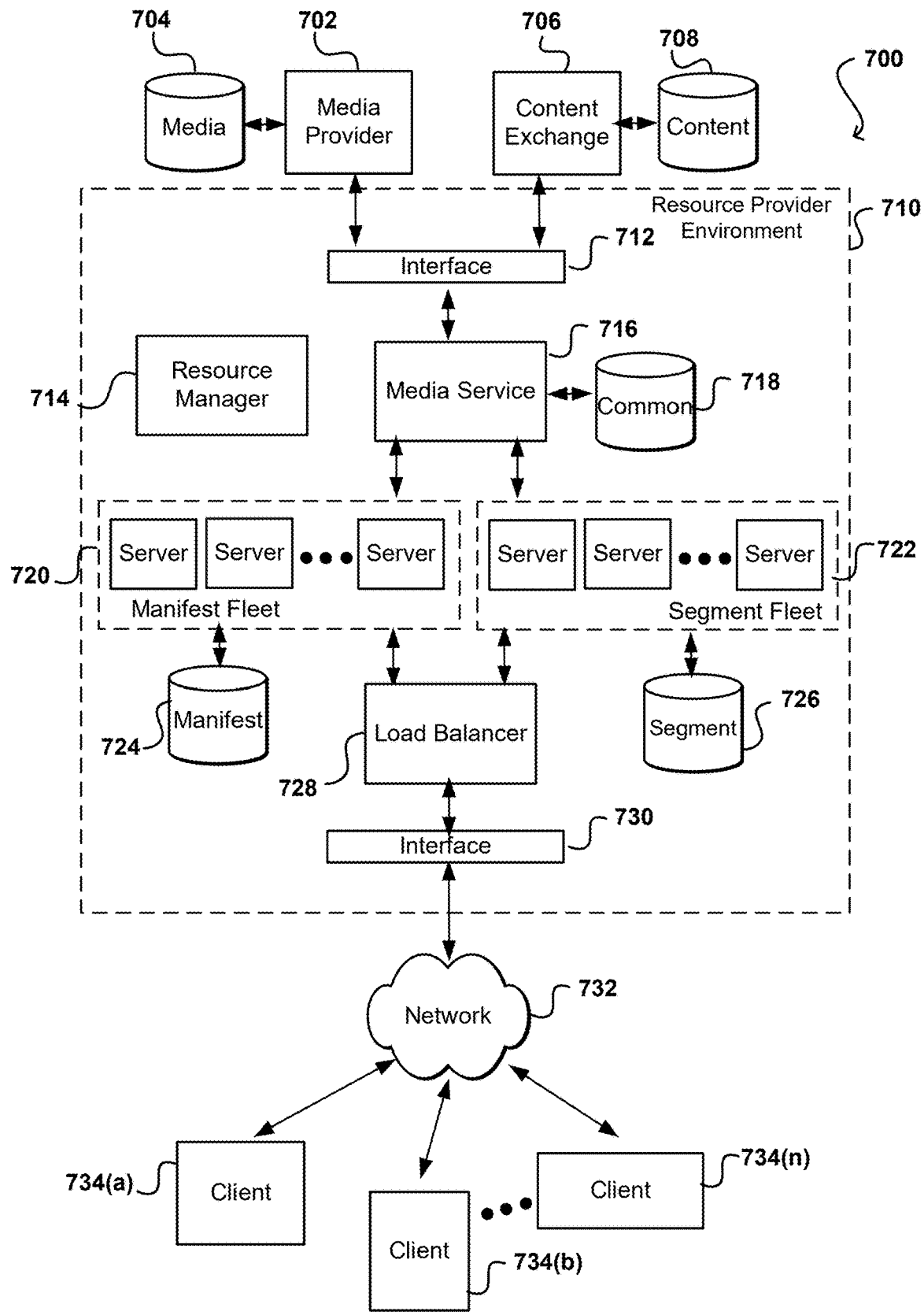
FIG. 7 illustrates an example system that can maintain separate manifest and segment fleets, in accordance with various embodiments.

Accordingly, approaches in accordance with at least one embodiment can split the fleet into at least two smaller fleets. FIG. 7 illustrates a content delivery system 700 including such a division of fleets. As discussed previously, such a system may receive media content 704 from a media provider 702 and supplemental content 708 from a content exchange, among other such sources and types of content. The content can be received through an interface layer 712 and processed using a media service 716 that may use common data 718 as discussed herein. In such a system, where a first fleet 720 of resources can be tasked to handle manifest-related tasks, in conjunction with manifests 724, and a second fleet 722 of resources can be tasked to handle segment-related tasks for various media segments 726. In at least one embodiment, it is possible for a given resource to be included in both fleets, although the sub-groups will at most partially overlap due at least in part to different scaling needs. In another embodiment, the first fleet 720 may be selected to exclusively handle manifest-related tasks while the second fleet 722 exclusively handles segment-related tasks. A load balancer 728, such as an application load balancer, can use information such as URL path suffixes of incoming requests to route the requests to the correct fleet. By splitting the request handling across the two different fleets of resources (e.g., hosts or compute instances), a system or resource manager 714 can more accurately scale the number of instances in each fleet 720, 722, and can also better scale the size of the individual instances being used in each fleet to better match their respective workloads. In at least one embodiment, both fleets 720, 722 are backed by a common data store which is used in both workflows, so that the both fleets are using the same data to produce their output.

The second fleet 722 allocated for use in segment processing can be larger, in order to provide greater capacity to handle the additional load for the larger segments, where that scale is not necessary for handling tasks for much smaller manifests. Complex processing may be needed on these large segments, such as to provide for encryption and processing, while resources used for manifests may need more network capacity, such as to access information from database records to be used to build, update, or utilize information stored in the manifests. The splitting of fleets also helps to improve cache affinity, as each fleet will only be tasked with caching one type of requests. The cache for the manifest fleet will only cache manifests and will not be filled up with cached segments. Such an approach also provides additional blast radius reduction, as issues that impact the manifest fleet will not impact the segment processing fleet, which can continue handling requests. In addition, routing segment and manifest requests into separate fleets can provide improvement in monitoring and diagnostics with respect to single fleet approaches, as the metrics and logging are separated between the two fleets, which can help to provide better insights into any issues that arise for either the manifests or the segments. The segments can then be delivered over at least one network 732 to various client devices 734(*a*)-(*n*) or other such recipients.

As mentioned, a common (or shared) data store can be used for both fleets, enabling them to access the same internal database records for tasks such as video processing. Further, even though separate fleets of resources are used for the segments and manifests, a media player in at least one embodiment need only connect to a single domain that is used for both manifests and segments. A load balancer 728 can user path-based routing so the request all can come into the same domain name or load balancer, where the application load balancer can inspect the incoming URL path to determine whether the request relates to a segment or manifest and can be directed to the appropriate fleet. While such an approach may add undesirable complexity for historical appliances, encoders, or packager that is single node-based, for example, advantages can be obtained in a multi-tenant environment that shares resources across multiple user accounts. Separate scaling can have additional benefits as well. For example, a content management service can perform manifest manipulation, inserting ads or other supplemental content that may be unique for each customer. Such functionality can drive much more load to the manifest fleet, but all of the segments can be shared by the downstream cache so there can be a significant difference in the level of load that comes in between the two services. By separating the fleets, a provider can gain significant flexibility and scalability, in addition to being able to better tune the resources of each fleet based on their respective tasks and workloads to provide for better scaling capacity to be able to handle more novel use cases from users. Further, the splitting of fleets can be done without any knowledge on the part of the users, content viewers, or media players.

A content management and/or delivery service such as is described with respect to FIG. 1, 4, or 7 can be multi-cellular in nature. Such a service can be provided using a set of services of a multi-tenant environment, and the resources can be provisioned according to a resource hierarchy. There can be a top-level group of this hierarchy, such as a channel group, where users can group their content, and this grouping can be assigned to a cell. There can be at least some level of isolation between cells, which can provide for some level of blast radius separation in the event of a failure or event. If the resources allocated to one cell become unavailable, or there is an issue with service dependency in a specific cell, the resources of other cells should not also be impacted. Such separation can introduce some challenges and complexities for services, such as control plane services, that determine how to route or allocate top level resources between cells.

An approach in accordance with at least one embodiment can provide a proxy routing layer that can sit on top of these cells, and can be pointed to a number of cells, such as cells in a given region. A user can create a new channel group, allocated to a new cell, and the proxy layer can perform the appropriate routing. The proxy layer can include logic that can be used to determine placement of the new channel group. While there may be many routing complexities in multi-cellular systems, approaches in accordance with various embodiments can address the issue of idempotent creation. In idempotent creation, a user can send a create request, which can request creation of a new resource allocation or instance, new data table, and so on. There might be a situation such as a network disruption that can cause the create request to not be received or processed, or not have an acknowledgement received back to the user. In such instances, the user may resubmit the create request. the customer will retry the request. If the resource was already created in response to the first request, and another instance of that resource is created in response to a resubmitted request, then a conflict can be generated between the two instances of the same resource, and in many instances an exception can be generate for the resubmitted request indicating that the resource already exists.

Figure 8:
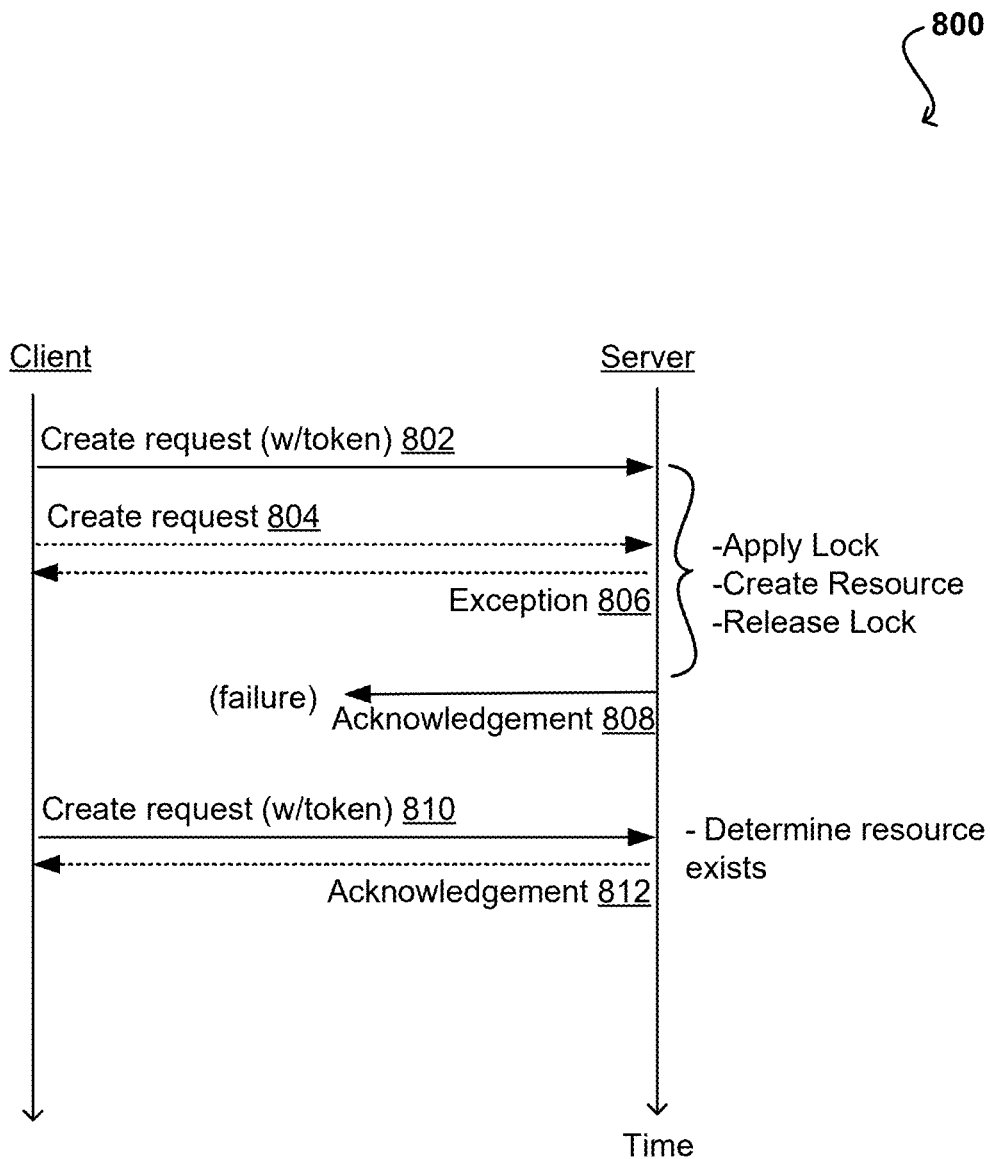
FIG. 8 illustrates an example flow of create requests with idempotent tokens, in accordance with various embodiments.

In order to minimize the generation of such exceptions, approaches in accordance with at least one embodiment can provide for the use of idempotent tokens with create requests. An example flow 800 of messages is illustrated in FIG. 8. A user (or other such entity) can submit a create request 802, and the user can submit an idempotency token with the create request. As discussed later herein, when the request is received by a server (or other creation resource), a lock can be applied across the various cells and the resource can be created. After creation, the lock can be removed and an acknowledgement 808 sent to the client in response to the creation. If a subsequent create request 804 is received during resource creation, an exception can be returned 806.

Due to a network failure or other such cause, the acknowledgment 808 might not be received to the appropriate client or destination, or may be received but not noticed or properly reported, etc. If the user does not receive (or is not aware of receiving) the acknowledgement 808 of the creation, the user may decide to resubmit the create request 810 for the same resource, and user can attach or associate the same idempotency token with the resubmitted request. The inclusion of the idempotency token with both requests enables a resource creation service, or resource manager, to determine the duplication based on the detection of the same idempotency token across multiple create requests. In at least one embodiment, if the resource is created in response to the first create request but a subsequent request is received that includes the same idempotency token, instead of returning a resource already exists exception, the system can return an acknowledgment 812 as if the resource had been created in response to the second request. In this way, the user does not need to worry or even know about the resource already having been created, or managing an exception, but can receive an acknowledgement back in response to the second (or subsequent) creation request. The use of the same idempotency token can also help the service to determine that the subsequent creation request is a duplicate, and that the target resource has already been created, so that another conflicting instance is not generated.

In at least one embodiment, a lock can be applied at the proxy routing layer to ensure that any duplicate requests to create the same resource, including the same idempotency token, are directed to the same cell. Such a lock can help to ensure that there are not conflicting requests in flight that are directed to different cells and then may not be identifiable as duplicates. There can be a guaranteed routing record stored at the routing layer across all cells to ensure all create requests with the same idempotency token are directed to the same cell and can be detected as duplicates. If the resource had not been created in response to the first create request then the resource can be created in response to the second request. If the resource had been created in response to the second request, but the associated user for some reason was not notified or did not notice and handle the fact that the resource had already been created, and a second create request is received for the same resource including the same idempotency token, then the service can assume that the user does not know that the resource has been created and can simply send an acknowledgement that the resource has been created.

In one example, a media delivery service can persist customer resources in databases across a number of cells of the cellular architecture for blast radius reduction. A control plane component can apply a lock at the cell routing layer to ensure only one in-flight create request for a given resource identifier is possible. A database lock record can be atomically created at the routing layer that is keyed on the resource identifier, as determined by the user's create request. The attached idempotency token in this instance can include any unique string or identifier, such as a globally unique identifier (GUID). At this point the lock can be considered to have been acquired or applied. The service can then look up an existing cell routing record for the resource identifier or create a new cell routing record for the resource identifier if one does not exist. The create request can then be sent to the determined cell. For the duration of the request processing, or until the routing layer receives a response from the cell, the GUID of the database lock record can be updated periodically, such as one per second. When the routing layer receives a response from the cell, the routing layer can delete the lock database record, releasing the lock, and forward the response to the user, client, or other appropriate recipient. If the database lock record already exists for a received request, the service can wait for a period of time, such as around 5 seconds, and if the GUID is unchanged during the wait period, the lock can be considered stale (for not having been updated each second) and the lock can be overwritten. The request can then be processed normally. Otherwise, if the GUID is updated during the wait period, a conflict response can be returned to the user signaling that they should retry their request. If a user resubmits a create request for the same resource, but does not include the same GUID, then the user can receive a resource already exists exception. Once the user receives acknowledgement of the creation, the user can delete the GUID (or other value in the idempotency token) and not reuse that GUID for a subsequent create request.

As mentioned previously, a service such as a media content delivery service can concurrently ingest multiple content streams in parallel. Metadata for incoming media content in many instances is to be converted into output segment metadata. Performing such conversion can require fetching all of the previous input and output segment metadata, which can require significant amounts of time and resources. Instead of fetching all the previous output segments, approaches in accordance with various embodiments can instead store all of the current output segments along with the previous input segments in a single compressed timeline record per sequence. Such an approach to storage can reduce the number of records needed to be fetched to only the new input segments and the previous timeline record. Since all the input and output segments have nearly identical values, such an approach can also achieve significant compression.

In prior approaches, a large number of segments could be ingested, and separate database records generated and stored for each segment. When a conversion or other such operation on an instance of content is to be performed, it would then be necessary to read all those egress records, and generate a new set of egress records building on that data. Such a process can end up generating a very large number of records, which can result in undesirable amounts of latency due to the time needed to perform this large number of reads. A service in accordance with at least one embodiment can accumulate and store all the related egress segments that have been received as a single batch. The data stored to this batch also can have been compressed. The service can fetch and decompress the data from any prior related egress data, for example, and then use that data to generate a new set of egress records. A single new timeline record can then be compressed and stored to the database based in part on the prior timeline data. The timeline can then be used to generate or update the manifest identifying segments for the instance of content. A service can take the data for the various segments and write out a single record for a slice of video that has the necessary information about constituent different resolutions and segments that make up, for example, a given slice of video content. Since the data is stored as one larger record instead of many smaller records, the service can better compress any redundant information across the different resolutions or streams that comprise the overall content. For example, a service might receive around 40 different input segments that represent a single sequence of data or time sequence. This information can be tracked in a compressed timeline record, as well as the egress state at that specific point in time. The next time a manifest needs to be generated for that content, the stored record can be read, decompressed, and updated as appropriate. A similar approach can be used with outgoing media segments, where a single record can be maintained and accessed when producing output for that instance of media content. In one embodiment, the records can take the form of compressed JSON records in a DynamoDB table. The record can be updated anytime there is an update to state information for the media content. Tables can be used for ingress, midgress, and egress operations. For example, there are some types of manifests that require listing all of the segments across all of the streams. Collection and compression of the data into a single record can provide similar advantages for such an operation. At midgress, such an approach can be used for the various endpoints, such as to re-aggregate the appropriate data, expressing a manifest that can communicate all of the necessary information being produced for that endpoint.

Figure 9:
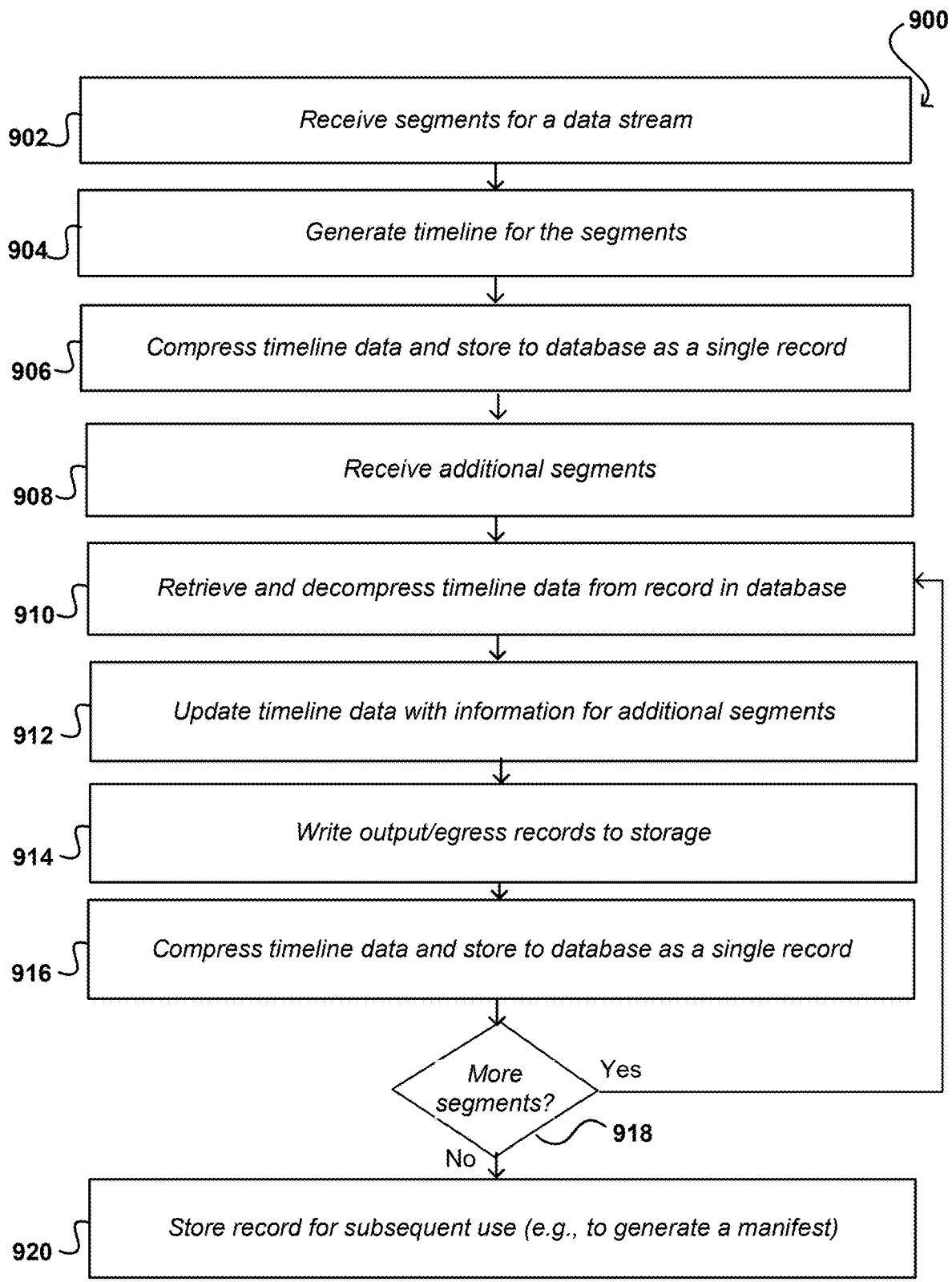
FIG. 9 illustrates an example process to aggregate and compress timeline data, in accordance with various embodiments.

FIG. 9 illustrates an example process 900 that can be performed to store data in a compressed timeline according to at least one embodiment. In this example, multiple segments are received 902 for at least one data stream for an instance of content. A timeline can be generated 904 for these segments, and the generated timeline data can be compressed 906 and stored to a database as a single record. When additional related segments are received 908, the timeline data can be retrieved 910 and decompressed from the record in the database. The timeline data can be updated 912 with new data for the segments. In at least one embodiment, a number of egress or output records can be written 914 to storage that will be separate from the compressed timeline. An egress record might include, or be part of a stream set to store information about the streams across various instances. One or more endpoint segment records may also be written to storage, which can be used to retrieve a single segment for audio and/or video without a need to pull down the entire compressed record. These egress/endpoint records can be referred to by one or more timelines, for at least certain periods of time, and can be used to serve egress requests as well. The compressed timeline can then be written, as may refer to one or more of these egress records. The updated timeline data can be compressed 916 and stored to a database as a single record. A determination can be made 918 as to whether there are additional related segments, and if so the process can continue. If not, the single database record with the compressed timeline can be stored 920 for subsequent use, such as to generate a current manifest for the associated instance of content. Such an approach can include timeline data for all current input and output segments together in a single compressed timeline record per sequence, which can reduce the number of records to be fetched to the new input segments and the previous timeline record. As mentioned, such an approach can also allow for significant compression of the single timeline data.

In a service such as a content delivery service, a user or might provide a sequence of programming or content that is accessible from the same endpoint, channel, or address. In some instances it can be desirable to ensure that all historical data associated with earlier programming is deleted or otherwise inaccessible. Similarly, there might be a situation where there is a bug or issue with a service, content, or media player so that the history of content on a video channel can cause problems when new content arrives on that channel. For example, there might be an issue with a transition between different types of content, or a media player may have incorrectly accrued excessive state data and playback of the channel is not occurring correctly. In prior approaches the channel could be deleted and a new channel created to address at least some of these issues. A downside to shutting down an existing channel and starting up a new channel is that the address or channel identifier (e.g., the URL) will change, and it is necessary to manage this change. This can create problems for users or players that are unable to correctly identify and use the new identifier.

Accordingly, approaches in accordance with various embodiments can store an identifier, such as a channel or event identifier, which can be stored to an internal database table or other such location. A channel reset request can be received, and the event identifier can be updated to point to the new channel without updating the underlying URL or other address used by the media player to obtain the content. The new channel can also be provided without a need to create or allocate any new compute instances or other such resources. A channel reset can be performed, but instead of having to manage a new link, the same link can be used but can point to a different event identifier, which can automatically locate the correct channel or stream of content which otherwise will have all of the same attributes but should be free of problems from historical data or activity that could potentially negatively impact new or current content.

There may be other reasons to reset a stream of content to remove access to historical data. For example, due to legal or contractual reasons a user may only be able to access content for a certain length or period of time, and then after that the customer should not be able to return to that content. Performing a channel reset can remove all of this historical data so that it can no longer be accessed by the user, even though the user is still viewing content transmitted over that channel. A media management service can thus use such a reset operation to make a clear delineation, and only allow content up to a certain point the past (corresponding to the reset) be accessible. Further, if there is a reason to be able to access the historical content or data, a rollback operation can be performed by reverting back to the prior event identifier. Such an approach can provide an advantage that if a reset was erroneously requested, the prior event identifier can be restored in order to make the historical data or content accessible once more. Such an approach can allow users to reset endpoints to clear content history without a need to change the URL or channel address, which would need to be handled by player and encoders, or deploy or allocate a new set of resources, etc.

In at least one embodiment, such an approach can involve resetting the state of a managed endpoint or all endpoints in a managed channel, such as to remove access to streaming history data. Event-based endpoints can pull content from previous events if the specified manifest length can reach back beyond the current running time of the current event, and a user wants to restrict the access to the content beyond the time window. Endpoints may also get into a confused state with too many stream set changes or interruptions in upstream content. The relevant egress URI will often be embedded a media player or content delivery network, and it can be inconvenient at least if a user removes the stream history by creating a new channel and/or endpoint which could potentially change the URI. As mentioned, each such endpoint can have a current event identifier assigned, which can be part of the key for all midgress and egress records, and similarly, each channel can have an identifier for ingress record. For a given endpoint, when the endpoint event identifier changes, a new set of records is created (e.g., endpoint streams, timelines, and segments records) that reference the endpoint and the endpoint event identifier. In at least one embodiment, manifest and segment egress requests will only see content from the current endpoint event identifier. When a user makes an API call to reset channel state or reset the origin endpoint state, for example, a media service can update the content record identifier deterministically. Under such a mechanism, a media service can also collect the stream history before the identifier change for some specific use cases, such as harvesting live content to VOD with the reset state behavior happening during the time window. In some embodiments, a user might periodically perform a refresh even if not needed, in order to minimize the likelihood of a problem based on, or related to, historical data or content for a given channel or stream. In some embodiments at least some amount of assessment can be performed to determine when such a reset is appropriate, such as where live content is converted into video-on-demand content stored to a specific repository, but a user may want to be able to "rewind" to the previously live content while still connected to the channel for the live stream.

Figure 10:
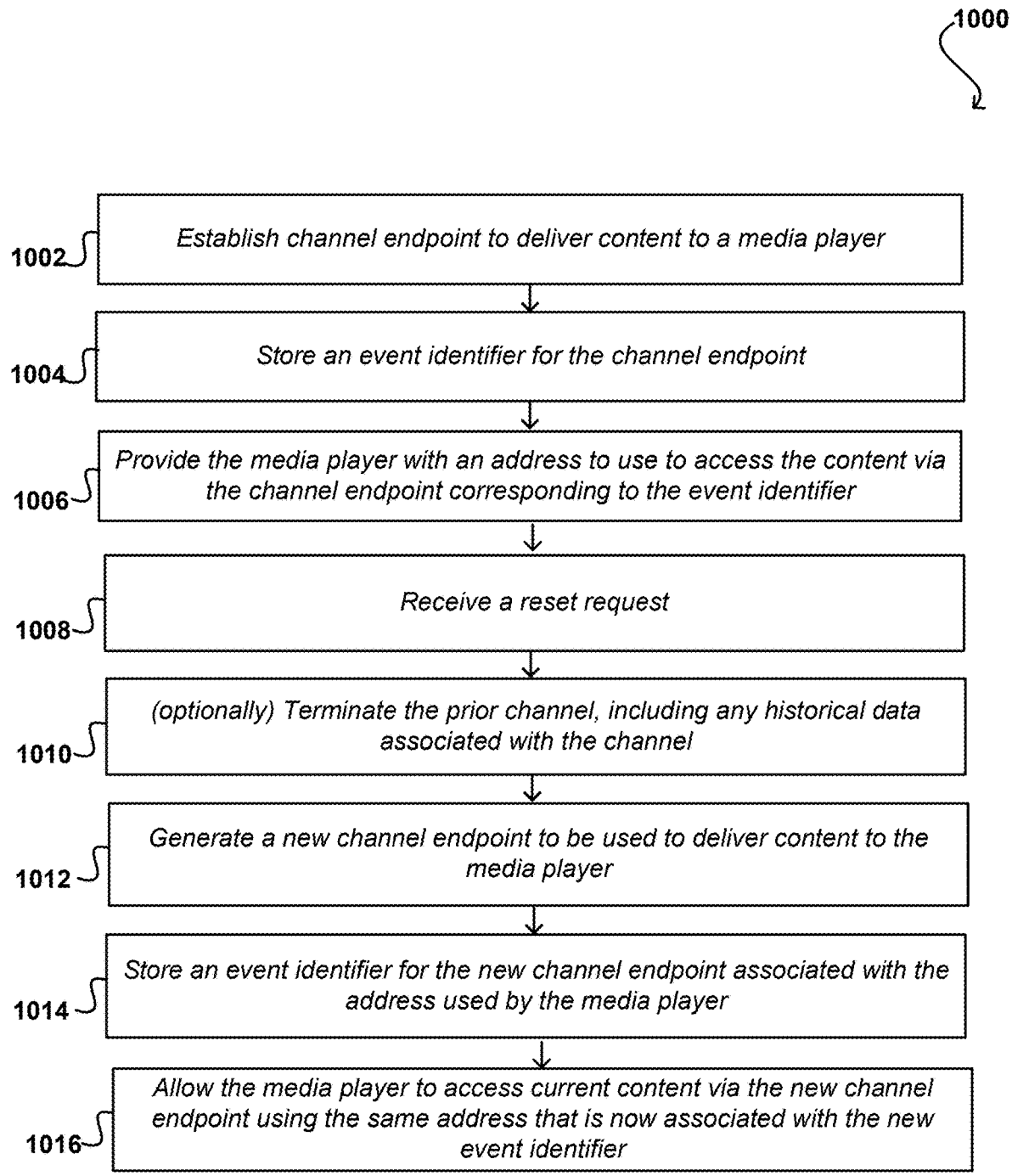
FIG. 10 illustrates an example process to allow for channel reset without a change in address, in accordance with various embodiments.

FIG. 10 illustrates an example process 1000 that can be performed to reset a channel for transmitting content according to at least one embodiment. In this example, a channel endpoint is established 1002 that is to be used to transmit or deliver content to a media player (or other such recipient device or application). An event identifier can be stored 1004 for the channel endpoint, such as may include storage to a table of a data repository. The media player can be provided 1006 with an address (e.g., a URI) to use to access the content via the channel endpoint, where the channel endpoint can be identified using the event identifier associated with the address. A request can be received 1008 to reset the channel. In at least one embodiment, the prior channel can be terminated 1010, including any historical data associated with that channel. In other embodiments at least some amount of historical data may be retained but associated with the prior event identifier. A new channel endpoint can be generated 1012 to be used to deliver current and future content to the media player. A new event identifier for the new channel endpoint can be stored 1014 as now being associated with the address used by the media player to access the content for playback. The media player can then be allowed 1016 to access current (and future) content via the new channel endpoint using the same address that is now associated with the new event identifier. If it is desirable to revert to the prior state, the prior event identifier can be restored to be associated with the address.

In some embodiments, users may want the option to create multiple distinct endpoints that correspond to only minor manifest differences or configuration changes. It is possible that these endpoints may otherwise share similar video segments. Approaches in accordance with various embodiments can allow a single origin endpoint to be created and used such that multiple manifests can share the same content segments. A user can use different manifests with shared video segments, but can use different configurations that may be appropriate for, or supported by, different types of devices or media players.

In at least one embodiment, a user may be able to create an unlimited (or at least large number) of distinct origin endpoints with minor manifest configuration changes, even though the endpoints may all share similar video segments. Using a prior approach, this would lead to a higher amount of processing that needs to be done by a packaging service, as the packaging service would need to create the same segments multiple times for all the endpoints. Further, CDNs and other caches register these segments as unique, despite them containing the same data, and that reduces cache hit rates.

Approaches in accordance with at least one embodiment can utilize an origin endpoint structure, which allows users to have a single origin endpoint where multiple manifests share the same segments. With such an endpoint structure, a user can create a new endpoint with a defined container type, and the user can specify the configuration for the video segments on the endpoint. A user can then create multiple different, compatible manifests on that same endpoint, and these manifests can all have shared video segments. Each manifest can contain different configurations, and can be of different manifest types. As an example, HLS and DASH manifests can be created on a single endpoint. The various manifests can be configured to reference a different set of streams, can be of different lengths, or can even be time-shifted differently, all while sharing common segments. Such an approach allows for a higher cache hit rate on segment GET requests, for example, since different players will all be getting the same segments, even though they might be reading different manifests. Such an approach can also reduce the amount of work a content management service needs to perform in order to create these segments. There can also be an increase in the segment cache hit rate on CDNs that sit upstream of such a content service, especially given that most of the video bandwidth is taken up by segments.

In at least one prior approach a user who wanted a new or additional endpoint configuration would need to use an independent resource to handle that. For example, an instance of content may need to be able to be played on an Android player, an Apple player, and a set top box, among other such devices or applications, that may all need different manifest formats for the same content. In prior approaches each of these configurations would correspond to a different endpoint with a different URL for all of the segments and all of the content. These endpoints also resulted in duplicate records in a database. There may be other configurations needed for other types of functionality, for example, and each of these configurations required its own set of unique endpoints with its own unique set of content.

Approaches in accordance with various embodiments can use a different data model to share segments. The actual video files that are transmitted to be played by a media player can now be shared among a large number of configurations, as an endpoint can be used that has a segment definition. A segment definition can indicate that a specific type of segment output is being produced, and there can be different manifests that indicate the stream, video data, and video segments that are available in different formats for different types of players. The same segment content can be shared for these various manifest.

In one example use case, video content will be received on a channel and the relevant segments can be stored to a repository. Metadata segments for the content can also be stored to a respective repository. One or more midgress processes can be performed to produce or update the appropriate the metadata records, and produce the appropriate output segments and the output manifests. Instead of every endpoint would having its own copy of all of these records, there can be one copy of these records and the appropriate configuration can be performed inside the relevant endpoint. There may be several manifests, as may be associated with different periods of time, allowable actions with respect to the content (e.g., pause and rewind), etc. Instead of requiring different endpoints, there may be multiple manifests associated with the same endpoint, such as one that relates to the last minute of content and one that relates to the last twelve hours of content. A user can then assign specific links (e.g., URLs) associated with the various manifests, so the channels can be served up indecently using the same endpoint. Other different types of configuration information can result in additional manifests to be associated with an endpoint as well, as may relate to additional servers downstream that need to be signaled in the manifest. Different players can require different manifest formats, but may share the same associated video segments. Both manifests can be available on the same endpoint sharing the same video segment, but allowing for support of multiple types of video players with different requirements. As mentioned, a given manifest can have a unique URL to which media players can connect to access and playback the content. The manifest may be in different formats as required, but the contents of the manifest are very similar, such as providing a list of other URLs or specific MP4 files that make up an instance of content. Multiple manifests can then be associated with a given endpoint that allow different media players to access and playback the same video segments from the same endpoint. The ability to share or reuse endpoints for multiple players can reduce the overall number of endpoints to be configured and maintained, which can reduce much of the complexity and cost in providing such endpoints. There are certain settings on an endpoint that have to be the same across the relevant manifests to allow the same segments to be provided. DRM is one example, as any encryption applied to the content will need to be the same for all access. While there can be some variation between segments, there need to be certain similarities to allow for access to the same video segments.

Figure 11:
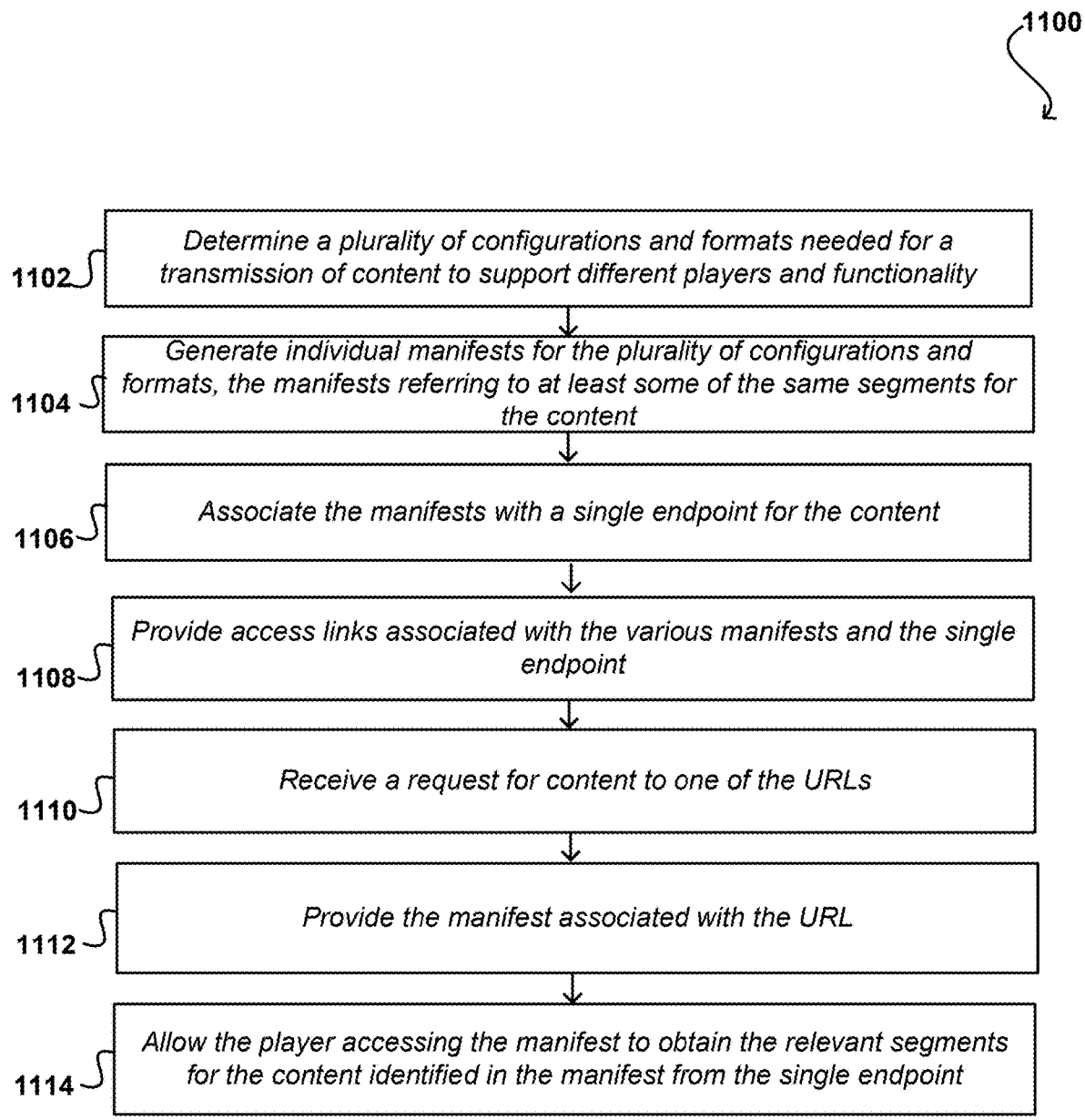
FIG. 11 illustrates an example process to allow multiple manifests to be used with a single endpoint to access content segments, in accordance with various embodiments.

FIG. 11 illustrates an example process 1100 that can be performed to allow different types of devices to access similar segments of content from a shared endpoint in accordance with various embodiments. In this example, a plurality of configurations and formats is determined 1102 that needed for a transmission of content to support different media players and functionality. Individual manifests can be generated 1104 for the plurality of configurations and formats, but where the manifest refer to at least some of the same segments for the content. The manifests can be associated 1106 with a single endpoint to be used for the content. Access links (e.g., URLs) can be provided 1108 that are associated with the individual manifests and the single endpoint. When a request is received 1110 to one of the URLs, the manifest associated with that URL can be provided 1112 in response. The relevant player can then be allowed 1114 to access the manifest in order to obtain locations for the relevant segments via the single endpoint.

Figure 12:
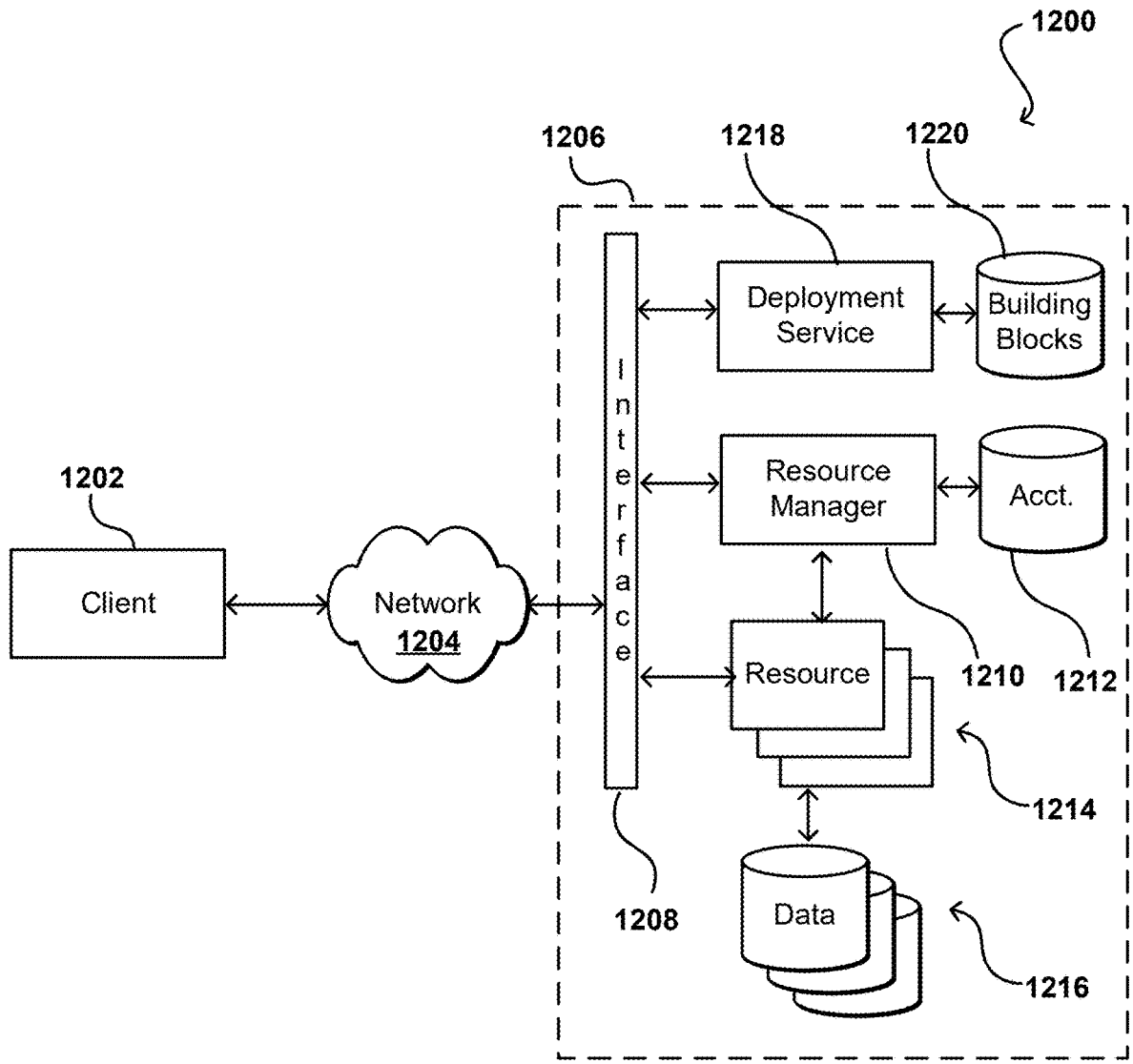
FIG. 12 illustrates an example network-inclusive computing environment in which aspects of various embodiments can be implemented.

FIG. 12 illustrates an example environment 1200 in which aspect of various embodiments can be implemented. Such an environment can be used in some embodiments to provide resource capacity for one or more users, or users of a resource provider, as part of a shared or multi-tenant resource environment. For example, the provider environment 1206 can be a cloud environment that can be used to provide cloud-based network connectivity for users, as can be used during disaster recovery or network optimization. The resources can also provide networking functionality for one or more client devices 1202, such as personal computers, which can be able to connect to one or more network(s) 1204, or can be used to perform network optimization tasks as discussed herein.

In this example a user is able to utilize a client device 1202 to submit requests across at least one network 1204 to a multi-tenant resource provider environment 1206. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 1204 can include any appropriate network, including an intranet, the Internet, a cellular network, a local area network (LAN), or any other such network or combination, and communication over the network can be enabled via wired and/or wireless connections. The resource provider environment 1206 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 1206 can include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 1214 of one or more types, which may each include at least one CPU and at least one GPU, among other such processing units. These types can include, for example, application servers operable to process instructions provided by a user or database servers operable to process data stored in one or more data stores 1216 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 1214 can submit a request that is received to an interface layer 1208 of the provider environment 1206. The interface layer can include application programming interfaces (APIs) or other exposed interfaces enabling a user to submit requests to the provider environment. The interface layer 1208 in this example can also include other components as well, such as at least one Web server, routing components, load balancers, and the like. When a request to provision a resource is received to the interface layer 1208, information for the request can be directed to a resource manager 1210 or other such system, service, or component configured to manage user accounts and information, resource provisioning and usage, and other such aspects. A resource manager 1210 receiving the request can perform tasks such as to authenticate an identity of the user submitting the request, as well as to determine whether that user has an existing account with the resource provider, where the account data can be stored in at least one data store 1212 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once a user (or other requestor) is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 1202 to communicate with an allocated resource without having to communicate with the resource manager 1210, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 1210 (or another such system or service) in this example can also function as a virtual layer of hardware and software components that handles control functions in addition to management actions, as can include provisioning, scaling, replication, etc. The resource manager can utilize dedicated APIs in the interface layer 1208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 1208 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

In at least one embodiment, one or more services may be deployed using a deployment service 1218. As mentioned, such a service may use a library 1220 of building blocks or templates for respective services, where the building blocks can contain the necessary code and infrastructure definitions, as well as default configuration that can be extended or customized by a vendor or other such party or entity. Vendor-specific services can be programmatically and functionally deployed, allowing for automated communication and interaction, with the vendor not having to worry about low level detail but instead being able to customize the service based on relevant business logic.

Figure 13:
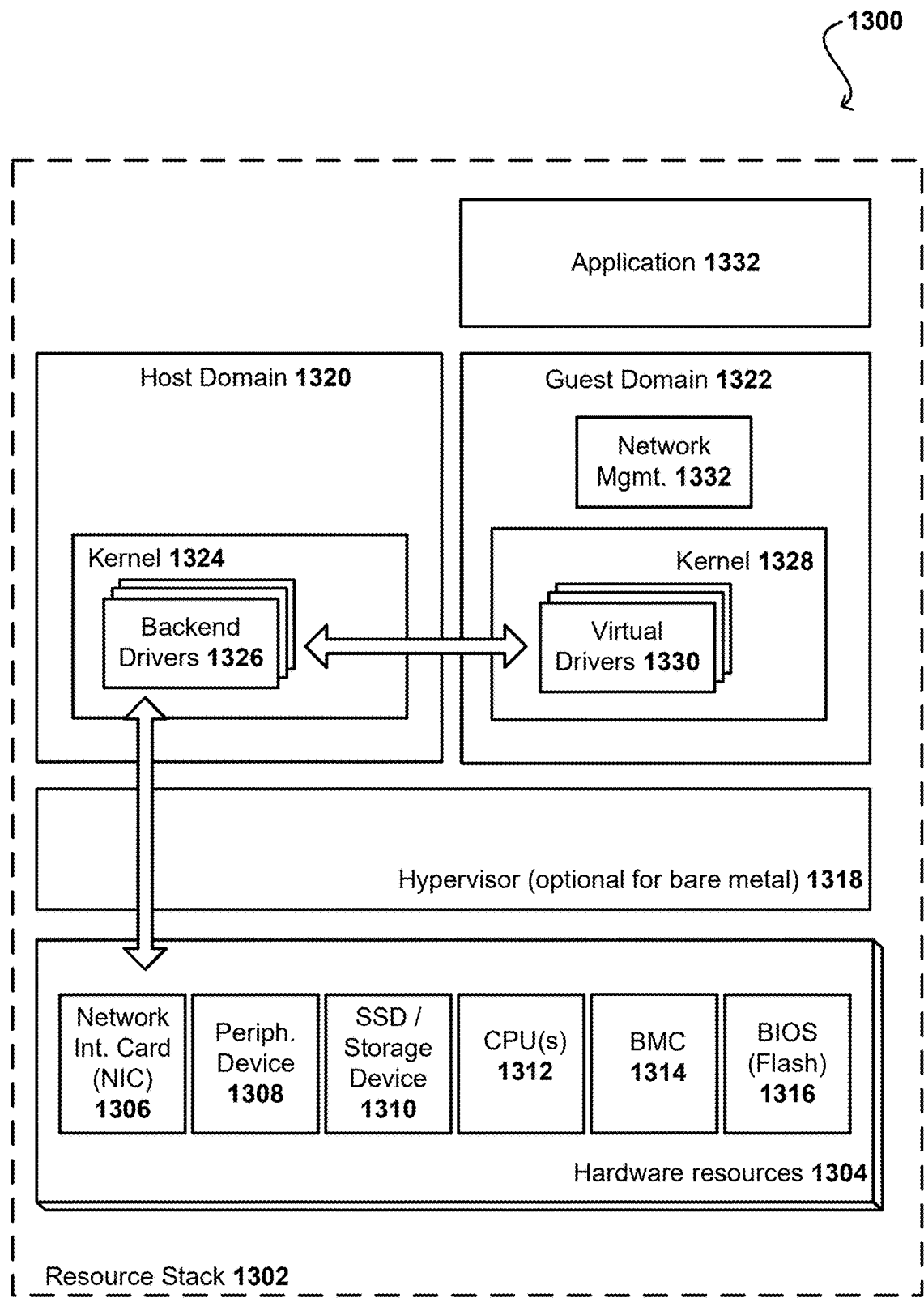
FIG. 13 illustrates example components of a server that can be utilized to perform at least a portion of a network management process, in accordance with various embodiments.

FIG. 13 illustrates an example resource stack 1302 of a physical resource 1300 that can be utilized in accordance with various embodiments, such as can be provided as part of a provider environment such as that illustrated in FIG. 12. Such a resource can be used as a network router, for example, which can be selected as a waypoint for determining a secondary transmission path or selected as part of a primary transmission path, among other such options. When performing tasks, such as network routing tasks using a routing application 1332 or service, for example, such resources can include components such as CPUs 1312 for executing code to perform these tasks, NICs 1306 for communicating network traffic, and memory for storing instructions and networking data. In some embodiments, an entire machine can be allocated for these tasks, or only a portion of the machine, such as to allocate a portion of the resources as a virtual machine in a guest domain 1322 that can perform at least some of these tasks.

Such a resource stack 1302 can be used to provide an allocated environment for a user (or user of a resource provider) having an operating system provisioned on the resource. In accordance with the illustrated embodiment, the resource stack 1302 includes a number of hardware resources 1304, such as one or more central processing units (CPUs) 1312; solid state drives (SSDs) or other storage devices 1310; a network interface card (NIC) 1306, one or more peripheral devices (e.g., a graphics processing unit (GPU), etc.) 1308, a BIOS implemented in flash memory 1316, and a baseboard management controller (BMC) 1314, and the like. In some embodiments, the hardware resources 1304 reside on a single computing device (e.g. chassis). In other embodiments, the hardware resources can reside on multiple devices, racks, chassis, and the like. Running on top of the hardware resources 1304, a virtual resource stack can include a virtualization layer such as a hypervisor 1318 for a Xen-based implementation, a host domain 1320, and potentially also one or more guest domains 1322 capable of executing at least one application 1332. The hypervisor 1318, if utilized for a virtualized environment, can manage execution of the one or more guest operating systems and allow multiple instances of different operating systems to share the underlying hardware resources 1304. Conventionally, hypervisors are installed on server hardware, with the function of running guest operating systems, where the guest operating systems themselves act as servers.

In accordance with an embodiment, a hypervisor 1318 can host a number of domains (e.g., virtual machines), such as the host domain 1320 and one or more guest domains 1322. In one embodiment, the host domain 1320 (e.g., the Dom-0) is the first domain created and helps virtualize hardware resources and manage all of the other domains running on the hypervisor 1318. For example, the host domain 1320 can manage the creating, destroying, migrating, saving, or restoring the one or more guest domains 1322 (e.g., the Dom-U). In accordance with various embodiments, the hypervisor 1318 can control access to the hardware resources such as the CPU, input/output (I/O) memory, and hypervisor memory.

A guest domain 1322 can include one or more virtualized or para-virtualized drivers 1330 and the host domain can include one or more backend device drivers 1326. When the operating system (OS) kernel 1328 in the guest domain 1322 wants to invoke an I/O operation, the virtualized driver 1330 can perform the operation by way of communicating with the backend device driver 1326 in the host domain 1320. When the virtualized driver 1330 wants to initiate an I/O operation (e.g., to send out a network packet), a guest kernel component can identify which physical memory buffer contains the packet (or other data) and the virtualized driver 1330 can either copy the memory buffer to a temporary storage location in the kernel for performing I/O or obtain a set of pointers to the memory pages that contain the packet(s). In at least one embodiment, these locations or pointers are provided to the backend driver 1326 of the host kernel 1324 which can obtain access to the data and communicate it directly to the hardware device, such as the NIC 1306 for sending the packet over the network.

It should be noted that the resource stack 1302 illustrated in FIG. 13 is only one possible example of a set of resources that is capable of providing a virtualized computing environment and that the various embodiments described herein are not necessarily limited to this particular resource stack. In some embodiments, the guest domain 1322 can have substantially native or "bare metal" access to the NIC 1306 hardware, for example as provided by device assignment technology based on an IO Memory Management Unit (IO-MMU) device mapping solution like Intel VT-D. In such an implementation, there can be no virtualization layer (e.g., Hypervisor) present. The host domain, or OS, can then be provided by the user, with no guest domains utilized. Other technologies, such Single Root IO Virtualization (SR-IOV), can provide similar "bare metal" functionality to guest domains for only certain functionality of the devices. In general, in various other embodiments, the resource stack can comprise different virtualization strategies, hardware devices, operating systems, kernels, domains, drivers, hypervisors and other resources.

In compute servers, a Board Management Controller (BMC) 1314 can maintain a list of events that have occurred in the system, referred to herein as a system event log (SEL). In at least one embodiment, the BMC 1314 can receive system event logs from the BIOS 1316 on the host processor. The BIOS 1316 can provide data for system events over an appropriate interface, such as an I2C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 1318 can prevent the guest operating system, or guest domain 1322, from sending such system event log data to the BMC 1314. In the case of bare metal access without such a hypervisor, however, user instances can have the ability to send data for system event that spoof events from the BIOS 1316. Such activity could lead to compromised bare metal instances being prematurely degraded due to fake system event data produced by the user OS.

In at least one embodiment, however, there will be portions of the physical resource 1300 that will be inaccessible to the user OS. This can include, for example, at least a portion of BIOS memory 1316. BIOS memory 1316 in at least one embodiment is volatile memory such that any data stored to that memory will be lost in the event of a reboot or power down event. The BIOS can keep at least a portion of host memory unmapped, such that it is not discoverable by a host OS. As mentioned, data such as a secret token can be stored to BIOS memory 1316 at boot time, before a user OS is executing on the resource. Once the user OS is executing on the resource, that OS will be prevented from accessing that secret token in BIOS memory 1316. In at least one embodiment, this secret token (or other stored secret) can be provided to the BMC 1314 when adding system event log events, whereby the BMC 1314 can confirm that the event is being sent by the BIOS 1316 and not by the user OS.

Figure 14:
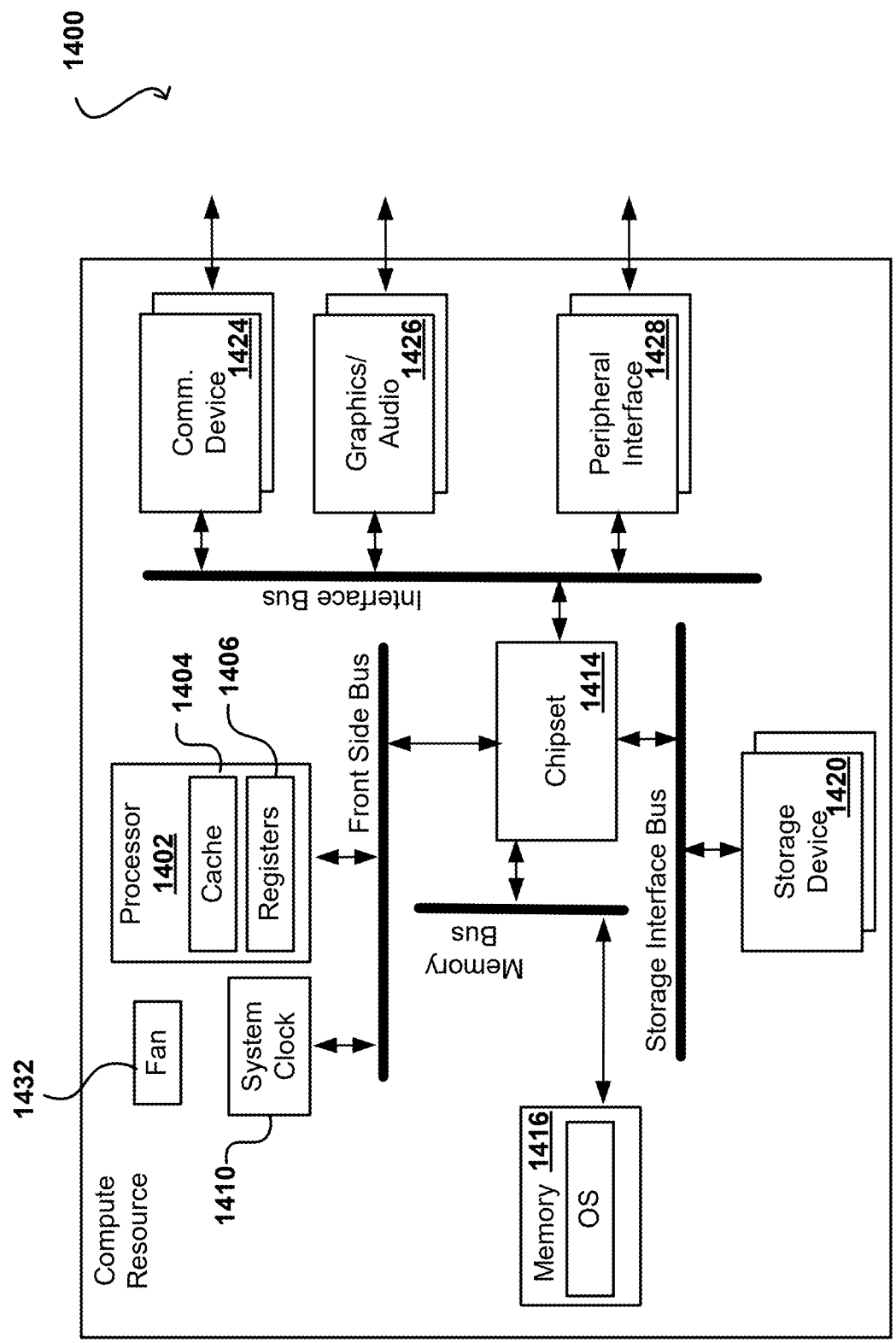
FIG. 14 illustrates example components of a computing device that can be used to implement network monitoring and management aspects of various embodiments.

Computing resources, such as servers, routers, smartphones, or personal computers, will generally include at least a set of standard components configured for general purpose operation, although various proprietary components and configurations can be used as well within the scope of the various embodiments. As mentioned, this can include client devices for transmitting and receiving network communications, or servers for performing tasks such as network analysis and rerouting, among other such options. FIG. 14 illustrates components of an example computing resource 1400 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 1400 (e.g., a desktop or network server) will have one or more processors 1402, such as central processing units (CPUs), graphics processing units (GPUs), and the like, that are electronically and/or communicatively coupled with various components using various buses, traces, and other such mechanisms. A processor 1402 can include memory registers 1406 and cache memory 1404 for holding instructions, data, and the like. In this example, a chipset 1414, which can include a northbridge and southbridge in some embodiments, can work with the various system buses to connect the processor 1402 to components such as a system clock 1410 and system memory 1416, in the form or physical RAM or ROM, which can include the code for the operating system as well as various other instructions and data utilized for operation of the computing device. The computing device can also contain, or communicate with, one or more storage devices 1420, such as hard drives, flash drives, optical storage, and the like, for persisting data and instructions similar, or in addition to, those stored in the processor and memory. The processor 1402 can also communicate with various other components via the chipset 1414 and an interface bus (or graphics bus, etc.), where those components can include communications devices 1424 such as cellular modems or network cards, media components 1426, such as graphics cards and audio components, and peripheral interfaces 1428 for connecting peripheral devices, such as printers, keyboards, and the like. At least one cooling fan 1432 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 1402 can obtain data from system memory 1416, such as a dynamic random access memory (DRAM) module, via a coherency fabric in some embodiments. It should be understood that various architectures can be utilized for such a computing device, which can include varying selections, numbers, and arguments of buses and bridges within the scope of the various embodiments. The data in memory can be managed and accessed by a memory controller, such as a DDR controller, through the coherency fabric. The data can be temporarily stored in a processor cache 1404 in at least some embodiments. The computing resource 1400 can also support multiple I/O devices using a set of I/O controllers connected via an I/O bus. There can be I/O controllers to support respective types of I/O devices, such as a universal serial bus (USB) device, data storage (e.g., flash or disk storage), a network card, a peripheral component interconnect express (PCIe) card or interface 1428, a communication device 1424, a graphics or audio card 1426, and a direct memory access (DMA) card, among other such options. In some embodiments, components such as the processor, controllers, and caches can be configured on a single card, board, or chip (i.e., a system-on-chip implementation), while in other embodiments at least some of the components can be located in different locations, etc.

An operating system (OS) running on the processor 1402 can help to manage the various devices that can be utilized to provide input to be processed. This can include, for example, utilizing relevant device drivers to enable interaction with various I/O devices, where those devices can relate to data storage, device communications, user interfaces, and the like. The various I/O devices will typically connect via various device ports and communicate with the processor and other device components over one or more buses. There can be specific types of buses that provide for communications according to specific protocols, as can include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device can be used, for example, as a server in a server farm or data warehouse. Server computers often have a need to perform tasks outside the environment of the CPU and main memory (i.e., RAM). For example, the server can need to communicate with external entities (e.g., other servers) or process data using an external processor (e.g., a General Purpose Graphical Processing Unit (GPGPU)). In such cases, the CPU can interface with one or more I/O devices. In some cases, these I/O devices can be special-purpose hardware designed to perform a specific role. For example, an Ethernet network interface controller (NIC) can be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device can be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device can be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components can be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) can also be utilized. Additionally, in other embodiments, one or more of the computing device resource components can be virtualized hardware components emulated by the host device. In such embodiments, the I/O adapter device can implement a management process in which a host device is configured with physical or emulated hardware components based on a variety of criteria. The computing device resource components can be in communication with the I/O adapter device via the communication channel. In addition, a communication channel can connect a PCI Express device to a CPU via a northbridge or host bridge, among other such options.

In communication with the I/O adapter device via the communication channel can be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches can be controlled together or independently. For example, the I/O adapter device can selectively close a hardware latch for one or more components based on a trust level associated with a particular user. In another example, the I/O adapter device can selectively close a hardware latch for one or more components based on a trust level associated with an author or distributor of the executable code to be executed by the I/O adapter device. In a further example, the I/O adapter device can selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches can be controlled together or independently.

As discussed, different approaches can be implemented in various environments in accordance with the described embodiments. As will be appreciated, although a network- or Web-based environment is used for purposes of explanation in several examples presented herein, different environments can be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which can be chained or otherwise configured, which can interact to perform tasks such as obtaining data from an appropriate data store. As used herein, the term "data store" refers to any device or combination of devices capable of storing, accessing and retrieving data, which can include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which can be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that can need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers can include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments can have numerous variations from that described above. For example, customized hardware might also be used and/or particular elements might be implemented in hardware, software (including portable software, such as applets) or both. Further, connection to other computing devices such as network input/output devices can be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the invention as set forth in the claims.

What is claimed is:

1. A computer-implemented method, comprising:
   storing a plurality of video segments to a plurality of storage devices in a multi-tenant environment;
   determining that a rate of requests being received with respect to the plurality of storage requests satisfies at least one buffering criterion;
   receiving a request to perform an operation with respect to a specified segment stored to a respective device of the plurality of storage devices;
   generating a random number within a range of a number of elements of a request queue;
   causing, if it is determined that a previously-received request is stored to the element of the request queue corresponding to the random number, the previously-received request to be transmitted to a corresponding device of the plurality of storage devices storing a segment corresponding to the previously-received request; and
   storing the received request to the element of the request queue corresponding to the random number.

2. The computer-implemented method of claim 1, further comprising:
   after the rate of requests being received no longer satisfies at least one buffering criterion, transmitting any remaining requests in the request queue to the plurality of storage devices.

3. The computer-implemented method of claim 1, wherein the request to perform an operation is a read request, a write request, or a delete request for the specified segment.

4. The computer-implemented method of claim 1, wherein the at least one buffering criterion corresponds to a request rate threshold, a request volume threshold, or a request traffic pattern.

5. The computer-implemented method of claim 1, further comprising:
    storing a plurality of placeholders to the elements of the request queue, the placeholders being deleted from the request buffer when received requests are to be stored to the elements to which the placeholders are stored.

6. A computer-implemented method, comprising:
    receiving a request for access to a data instance stored to one of a plurality of storage locations;
    selecting a random element of a request buffer to which to temporarily store the request;
    determining that a previously-received request, for access to a second data instance stored to one of the plurality of storage locations, is stored to the random element;
    causing the previously-received request to be pulled from the request buffer and processed to determine whether to provide access to the second data instance; and
    storing the request to the random element of the request buffer.

7. The computer-implemented method of claim 6, wherein the random element is determined using a random number, generated using a random number generator, from within a range of elements of the request buffer to which requests are able to be stored.

8. The computer-implemented method of claim 6, wherein a number of requests received with respect to the plurality of storage locations over a period of time exceeds a range of elements of the request buffer to which requests are able to be stored, and wherein an order of transmission of received requests is able to be randomized without storing all the requests in the request buffer at any time.

9. The computer-implemented method of claim 6, wherein storing the request and the previously-received request to randomly selected elements of the request buffer removes one or more correlations between the request and the previously-received request.

10. The computer-implemented method of claim 6, wherein the selecting of the random element is performed in response to at least one buffering criterion being satisfied with respect to the plurality of storage locations.

11. The computer-implemented method of claim 10, further comprising:
    after the at least one buffering criterion is no longer satisfied, transmitting any remaining requests in the request buffer to the plurality of storage locations for processing.

12. The computer-implemented method of claim 6, wherein the at least one buffering criterion corresponds to a request rate threshold, a request volume threshold, or a request traffic pattern.

13. The computer-implemented method of claim 6, wherein the request for access is a read request, a write request, or a delete request for the data instance.

14. The computer-implemented method of claim 6, further comprising:
    storing a plurality of placeholders to the elements of the request buffer, the placeholders being deleted from the request buffer when received requests are to be stored to the elements to which the placeholders are stored.

15. The computer-implemented method of claim 6, wherein a number of the elements in the request queue is selected to improve request throughput and storage location utilization.

16. A system, comprising:
    a processor; and
    a memory device including instructions that, when executed by the processor, cause the processor to:
        receive a request for access to a data instance stored to one of a plurality of storage locations;
        select a random element of a request buffer to which to temporarily store the request;
        determine that a previously-received request, for access to a second data instance stored to one of the plurality of storage locations, is stored to the random element;
        cause the previously-received request to be pulled from the request buffer and processed to determine whether to provide access to the second data instance; and
        store the request to the random element of the request buffer.

17. The system of claim 16, wherein the random element is determined using a random number, generated using a random number generator, from within a range of elements of the request buffer to which requests are able to be stored.

18. The system of claim 16, wherein a number of requests received with respect to the plurality of storage locations over a period of time exceeds a range of elements of the request buffer to which requests are able to be stored, and wherein an order of transmission of received requests is able to be randomized without storing all the requests in the request buffer at any time.

19. The system of claim 16, wherein storing the request and the previously-received request to randomly selected elements of the request buffer removes one or more correlations between the request and the previously-received request.

20. The system of claim 16, wherein the selecting of the random element is performed in response to at least one buffering criterion being satisfied with respect to the plurality of storage locations.

* * * * *